(12) United States Patent
Dobbyn

(10) Patent No.: US 10,751,659 B2
(45) Date of Patent: Aug. 25, 2020

(54) LEAKAGE DETECTION FOR INSTALLED FILTERS OF A MULTI-FILTER CONTAINMENT ENCLOSURE APPARATUS

(71) Applicant: APPLIED MEDICAL TECHNOLOGIES, INC., Creedmoor, NC (US)

(72) Inventor: Gregory John Dobbyn, Creedmoor, NC (US)

( * ) Notice: Subject to any disclaimer, the term of this patent is extended or adjusted under 35 U.S.C. 154(b) by 0 days.

(21) Appl. No.: 16/526,516

(22) Filed: Jul. 30, 2019

(65) Prior Publication Data

US 2020/0038794 A1 Feb. 6, 2020

Related U.S. Application Data

(60) Provisional application No. 62/712,735, filed on Jul. 31, 2018.

(51) Int. Cl.
| | | |
|---|---|---|
| *B01D 46/00* | (2006.01) | |
| *G01M 3/02* | (2006.01) | |
| *G01N 15/08* | (2006.01) | |
| *B01D 46/44* | (2006.01) | |

(52) U.S. Cl.
CPC ..... *B01D 46/0086* (2013.01); *B01D 46/0002* (2013.01); *B01D 46/0005* (2013.01); *B01D 46/0023* (2013.01); *B01D 46/442* (2013.01); *G01M 3/02* (2013.01); *G01N 15/0806* (2013.01); *B01D 2273/18* (2013.01); *G01N 2015/084* (2013.01); *G01N 2015/0846* (2013.01)

(58) Field of Classification Search
CPC ............ B01D 46/0002; B01D 46/0023; B01D 46/0086; B01D 2273/18; G01M 3/02; G01N 15/0806; G01N 2015/084; G01N 2015/0846
USPC ................ 356/237.1, 239.5, 240.1, 437–439
See application file for complete search history.

(56) References Cited

U.S. PATENT DOCUMENTS

| | | | | |
|---|---|---|---|---|
| 4,324,568 A | * | 4/1982 | Wilcox .............. | B01D 46/0013 239/514 |
| 4,619,136 A | * | 10/1986 | Ortiz ...................... | G01N 15/08 73/38 |
| 2014/0053634 A1 | * | 2/2014 | Woolard .............. | G01N 15/082 73/38 |
| 2017/0095771 A1 | * | 4/2017 | Venet ................. | B01D 53/0454 |
| 2020/0080925 A1 | * | 3/2020 | Huza ........................ | F24F 11/39 |

\* cited by examiner

*Primary Examiner* — Colin W Kreutzer
(74) *Attorney, Agent, or Firm* — Moore & Van Allen PLLC; Jeffrey R. Gray

(57) ABSTRACT

Embodiments of the present invention relate to apparatuses and methods for leakage detection for installed filters of a multi-filter containment enclosure, without requiring disassembly of the multi-filter containment enclosure. The containment enclosure of the present invention comprises a filter housing. The filter housing comprises one or more filter compartments for housing at least a first filter and a second filter. The filter housing comprises at least one port which is operatively coupled downstream of the first filter and upstream of the second filter. Typically, the at least one port allows for leak testing of the first filter and the second filter without having to remove the first filter and the second filter from the containment enclosure.

19 Claims, 11 Drawing Sheets

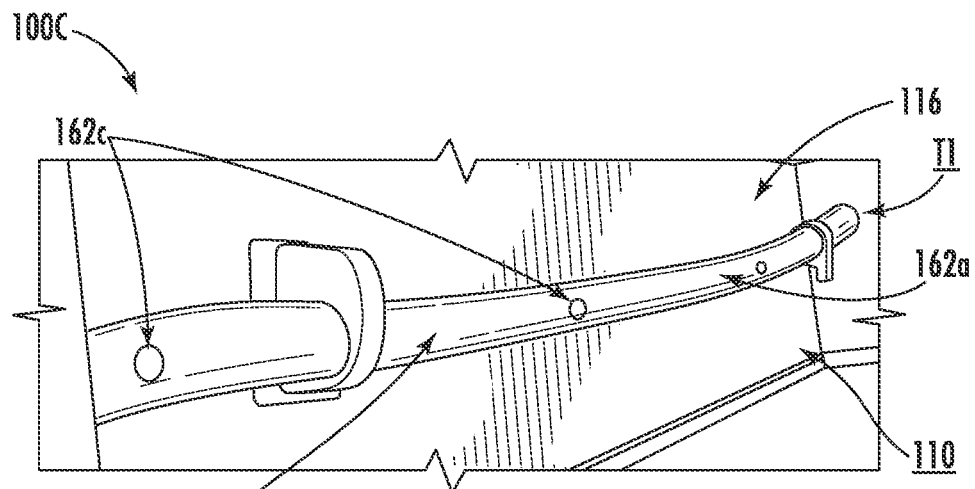
FIG. 2C
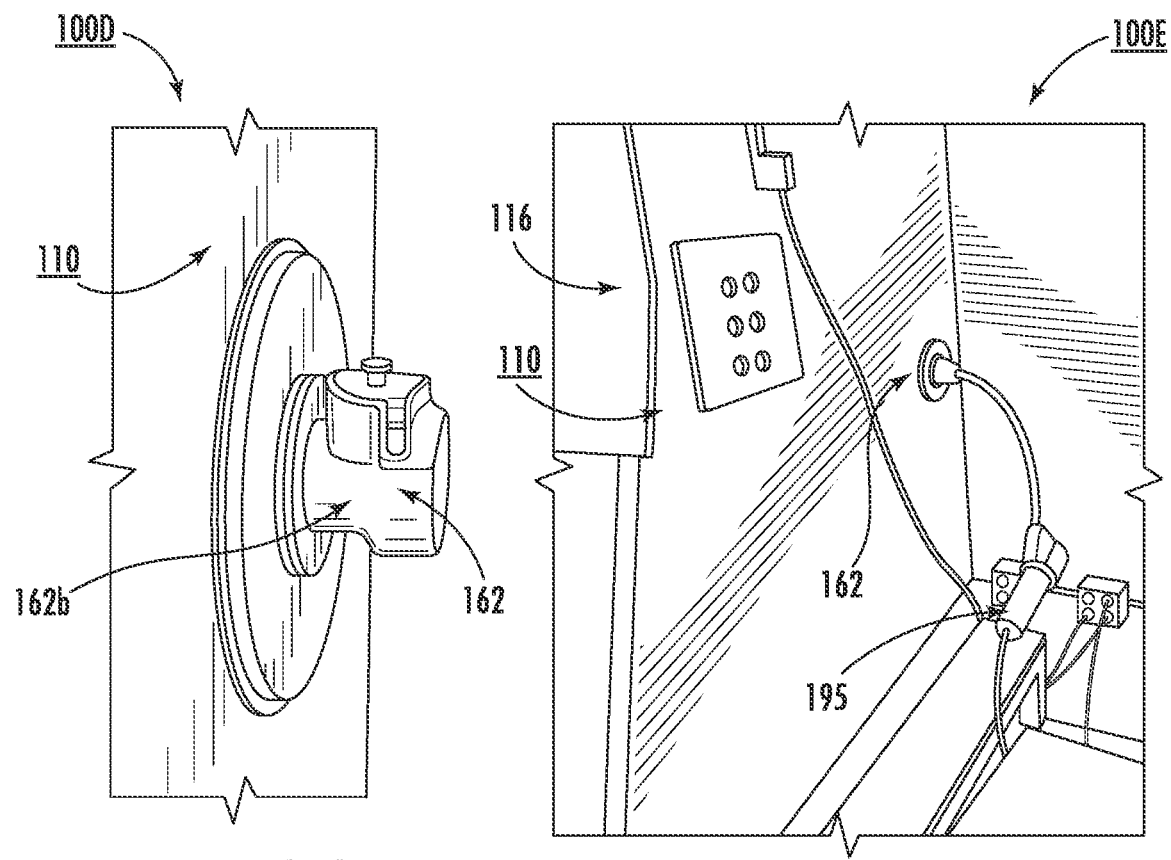
FIG. 2D
FIG. 2E

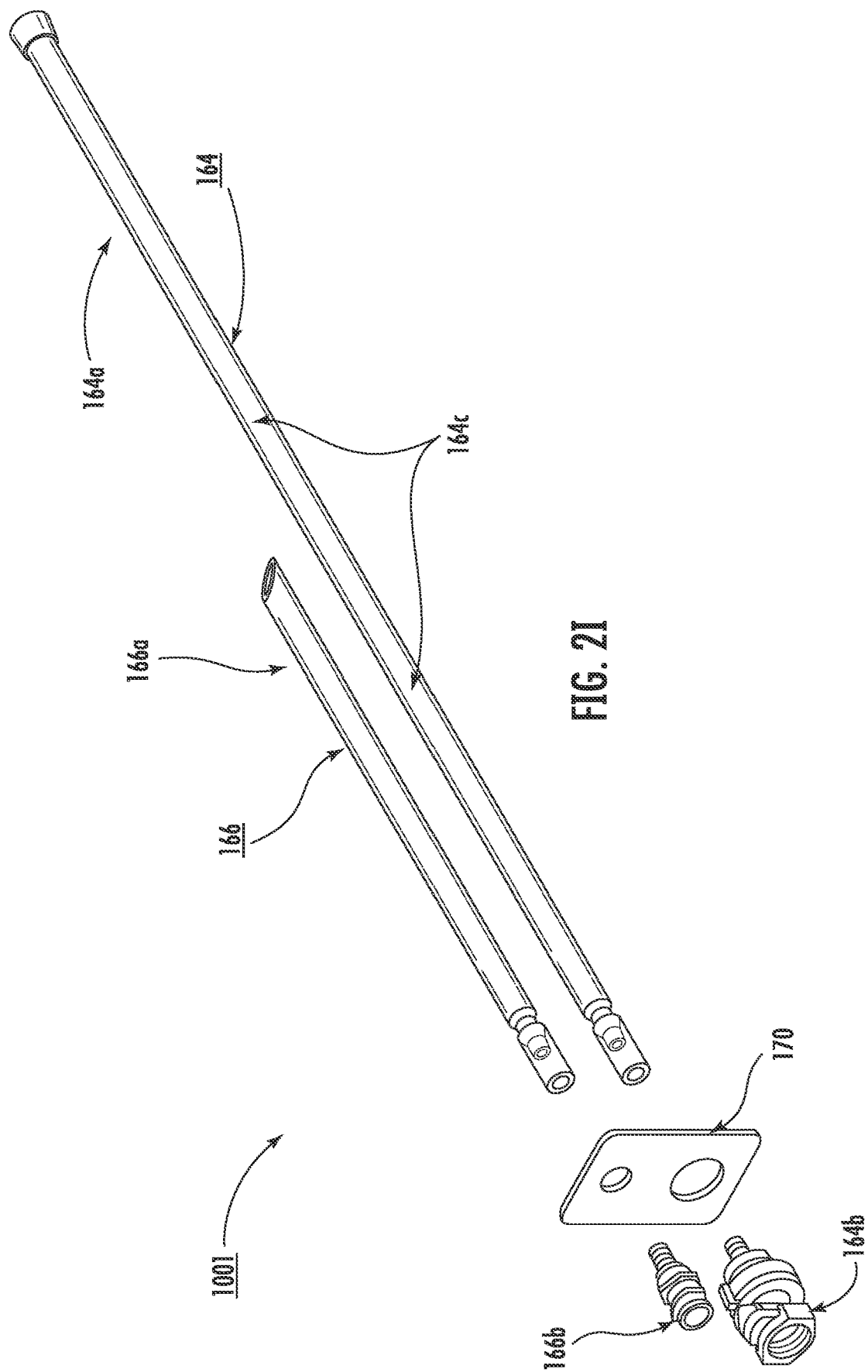

LEAKAGE DETECTION FOR INSTALLED FILTERS OF A MULTI-FILTER CONTAINMENT ENCLOSURE APPARATUS

CROSS-REFERENCE TO PRIORITY APPLICATION

This application claims priority to and the benefit of U.S. Provisional Patent Application Ser. No. 62/712,735 entitled "Leakage detection for installed filters of a multi-filter containment enclosure apparatus" filed on Jul. 31, 2018, which is hereby incorporated by reference in its entirety.

FIELD OF THE INVENTION

The present invention relates to detection of leakage in installed filters in general, and to detection of leakage in multi-filter apparatuses in particular.

BACKGROUND

Containment enclosures may have multiple filters installed in a housing assembly. These containment enclosures typically require their filters to be tested periodically. There is a need for improved containment enclosures with features that allow for improved testing.

BRIEF SUMMARY OF THE INVENTION

Embodiments of the present invention address the above needs and/or achieve other advantages by providing apparatuses and methods for leakage detection for installed filters of a multi-filter containment enclosure, without requiring disassembly of the multi-filter containment enclosure. The containment enclosure of the present invention comprises a filter housing. The filter housing comprises one or more filter compartments for housing at least a first filter and a second filter. The filter housing comprises at least one port which is operatively coupled downstream of the first filter and upstream of the second filter. The at least one port is utilized for operative coupling with a testing probe for sampling test air to determine leakage of the first filter when the test air is provided upstream of the first filter and sampled upstream of the second filter through the at least one port. Moreover, the at least one port is utilized for operative coupling with a test air supply for providing the test air downstream of the first filter in order to sample the test air downstream of the second filter to determine the leakage of the second filter through the at least one port. Typically, the at least one port allows for leak testing of the first filter and the second filter without having to remove the first filter and the second filter from the containment enclosure.

In some embodiments, the housing further comprises one or more testing compartments operatively coupled between the first filter and the second filter and to the at least one port. Typically, the one or more testing compartments are configured for capturing a test air sample and for providing the test air.

In some embodiments, the at least one port comprises a plurality of apertures. Typically, the plurality of apertures are configured to capture the test air sample from multiple locations downstream of the first filter when testing the first filter, and distribute the test air to multiple locations downstream of the first filter when testing the second filter.

In some embodiments, the at least one port comprises a single sampling and supply port that is utilized for both capturing a test air sample from the test air to determine the leakage of the first filter and supplying the test air to the second filter to determine the leakage of the second filter.

In some embodiments, the at least one port comprises (i) a supply port utilized for supplying the test air to the second filter to determine the leakage of the second filter, and (ii) a reference port, wherein the reference port is utilized for determining a reference point of the test air provided to the supply port to determine the leakage of the second filter.

In some embodiments, the at least one port comprises (i) a sampling port, wherein the sampling port is utilized for capturing a test air sample from the test air to determine the leakage of the first filter, and (ii) a supply port, wherein the supply port is utilized for supplying the test air to the second filter to determine the leakage of the second filter.

In some embodiments, the first filter is located in a first chamber and the second filter is located in a second chamber. Typically, the at least one port is operatively coupled to the first chamber downstream of the first filter, to the second chamber upstream of the second filter, or between the first chamber and the second chamber.

In some embodiments, the first filter is a Primary HEPA filter and the second filter is a permanent HEPA filter.

In some embodiments, the first filter comprises a ULPA filter and the second filter comprises a ULPA filter.

In some embodiments, the first filter comprises a Primary HEPA filter and the second filter comprises a ULPA filter.

In some embodiments, the testing probe comprises a photometer.

In some embodiments, the test air supply comprises an aerosol generator.

Embodiments of the invention are also directed to a novel method for testing filters of a containment enclosure, without removing the first filter and the second filter. Here, first, a containment enclosure, such as the containment enclosure discussed with respect to various embodiments above is provided. Typically, the provided containment enclosure, comprises: one or more filter compartments for housing at least a first filter and a second filter; and at least one port located in the containment enclosure, wherein the at least one port is operatively coupled downstream of the first filter and upstream of the second filter. Next, leakage testing of the first filter may be performed, which typically comprises the steps of: providing testing air upstream of the first filter of the containment enclosure; operatively coupling a testing probe with the at least one port for sampling test air to determine leakage of the first filter; sampling, via the at least one port, testing air downstream of the first filter; and determining, via the testing probe, whether there is a leakage in the first filter. The leakage testing of the first filter is typically performed without having to remove/disassemble the first filter and/or the second filter. Moreover leakage testing of the second filter may be performed by implementing the steps of: operatively coupling a test air supply with the at least one port; providing testing air from the test air supply, via the at least one port, upstream of the second filter of the containment enclosure; sampling, via the at least one port, a reference sample of the testing air provided upstream of the second filter; sampling, via the testing probe, testing air downstream of the second filter; and determining, via the testing probe, whether there is a leakage in the second filter based on at least the reference sample captured upstream of the second filter and the testing air sampled downstream of the second filter. The leakage testing of the second filter is typically performed without having to remove/disassemble the first filter and/or the second filter.

BRIEF DESCRIPTION OF THE DRAWINGS

The improved containment enclosure apparatus of the present invention provides improved testing of multi-filter assemblies. The advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein:

FIG. 2C illustrates a perspective sectional view 100C of the containment enclosure apparatus 100, in accordance with embodiments of the invention;

FIG. 2D illustrates a perspective side view 100D of the embodiments illustrated in FIG. 2C;

FIG. 2E illustrates a perspective side view 100E of the embodiments illustrated in FIG. 2C;

FIG. 2I illustrates a perspective exploded view 100I of ports 164 and 166, in accordance with embodiments of the invention;

DETAILED DESCRIPTION OF THE INVENTION

Figure 1:
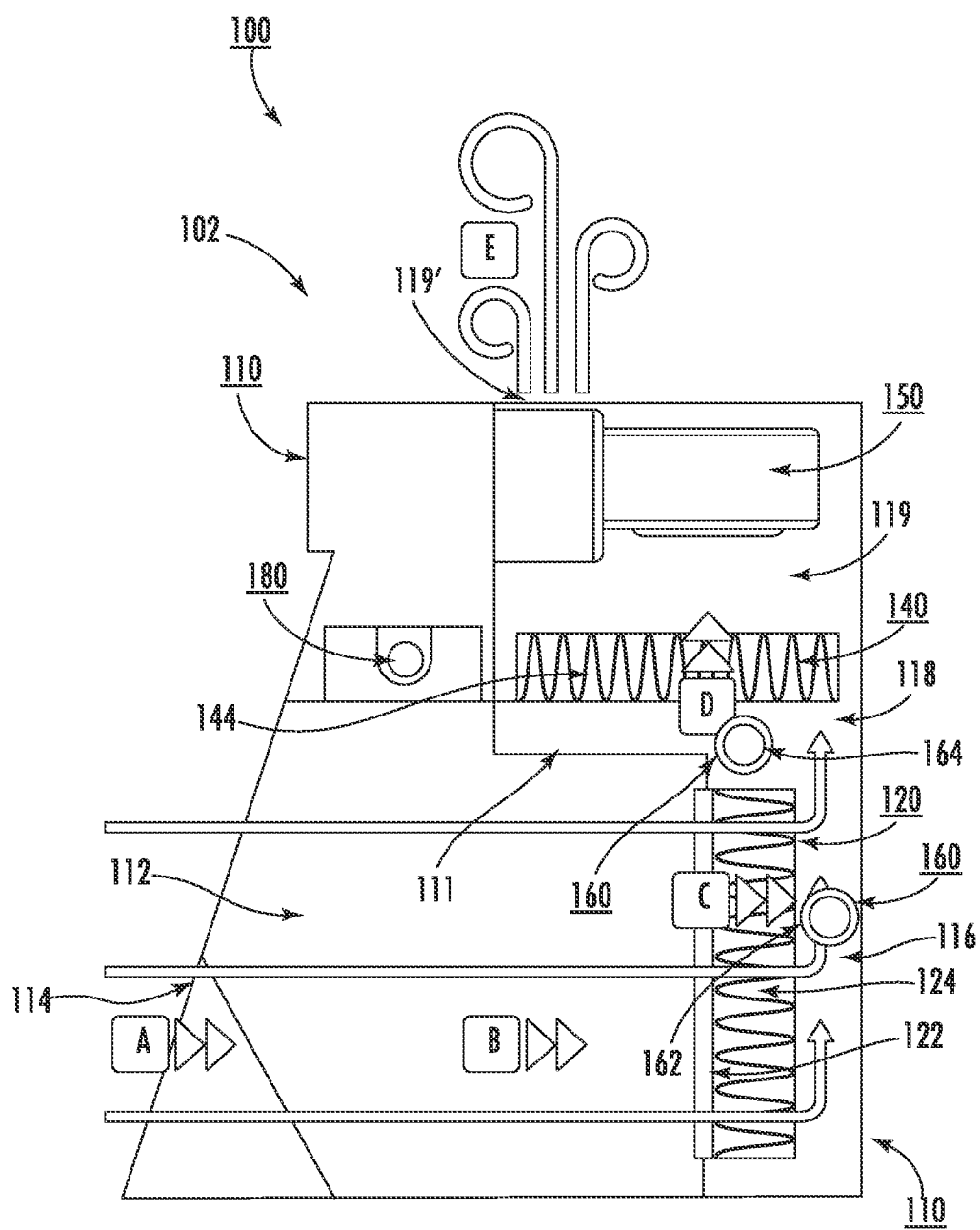
FIG. 1 illustrates a schematic cut away side view of a containment enclosure apparatus 100, in accordance with embodiments of the invention.

The present invention now will be described more fully hereinafter with reference to the accompanying drawings, in which some, but not all embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Containment enclosures are typically apparatuses that are structured to provide effective control and containment of airborne chemical mixtures during manipulation and transfer of potent compounds, fluids, particulates and/or gaseous compositions. In other words, containment enclosures are structured to remove contaminants from an air stream. "Chemical mixtures" as used herein, may refer to fluids, particulate, gases, chemical vapors, other contaminants and/or a mixture, dispersion or suspension of a suitable combination thereof, that are desired to be captured/filtered. "Air stream" or "air" may refer to atmospheric gases (typically having contaminants or chemical mixtures) in, around and/or enclosed a housing of the containment enclosure (e.g., those present in a laboratory environment) from which chemical mixtures are desired to be removed.

Containment enclosures typically comprise a plurality of filters. These filters are structured to capture predetermined airborne chemical mixtures during manipulation and transfer of potent compounds, fluids, particulates and/or gaseous composition. Various factors, such as particle load, fluctuations in pressure and temperature, and cleaning steps (which may have high temperatures or severe changes in pH), can cause wear to the filter elements. Typically, each of these plurality of filters are required to be tested, for instance, to determine whether the filter comprises a leakage or whether the integrity of the filter has been damaged. However, in conventional containment enclosures, testing of one of the filters individually entails dismantling of the housing assembly, removal of filters that are not currently being tested and reassembly of the housing assembly with the filter being tested. Moreover, this cumbrous and unwieldy process, in itself, is ineffective because removal of a first filter after testing, for the purposes of testing a second filter, invalidates the testing performed on the first filter. Hence, because in conventional containment enclosures (i) previously tested filters are required to be disassembled for the testing of a subsequent filter, and (ii) once disassembled, the leak testing of the previously tested filters in invalidated, testing of multiple filters in Conventional containment enclosures is not only a time consuming process and arduous but also may be largely futile and ineffective. In addition, the complexity and intricacy of the operations involved make errors more likely (e.g., errors in reassembling the filters and other components), which would in turn further render the testing process incorrect and inefficient. Accordingly, there is a need for leakage detection and testing apparatuses and methods for installed filters of a multi-filter containment enclosure, individually, by injecting testing fluids (e.g., fluids or gases different from fluids associated with regular operation), without requiring disassembly or dismantling of the housing assembly or the filter assemblies, or removal of the filters therein.

The containment enclosure apparatus (also referred to as "Bulk Handling Enclosures," "Ductless Fume Hoods," "Filtered Workstations," "Powder Containment Hoods," "Powder containment enclosures," or "Powder Containment Workstations" herein) of the present invention alleviates the foregoing deficiencies of conventional systems and also provides additional advantages. As such, a "containment enclosure" as used herein may refer to an apparatus, device, workstation, hood, and/or enclosure structured for bulk handling, containment and processing of fumes, powders, or the like, such as a Bulk Handling Enclosure, a Ductless Fume Hood, a Filtered Workstation, a Powder Enclosure, a Fume Enclosure, and/or the like. In some embodiments, the containment enclosure of the present invention comprises a plurality of filters, although it is contemplated that in other embodiments the containment enclosure comprises at least one filter or a single filter. These filters are structured to capture predetermined airborne chemical mixtures during manipulation and transfer of potent compounds, fluids, particulates and/or gaseous composition, based on at least one filtration method such as straining, impingement, interception, diffusion, electrostatic attraction, particle filtration, chemical absorption or adsorption, and/or chemical reactions to neutralize the airborne chemical mixtures. The air stream after passing through one or more of the filters is typically free of the chemical mixtures and is re-circulated in the vicinity of the containment enclosure and/or the atmosphere of the room containing the containment enclosure. In some embodiments, one or more of the filters are bonded carbon filters. In some embodiments, one or more of the filters are activated carbon filters. In some embodiments, the one or more filters are bonded carbon filters, activated carbon filters, loose carbon filters, high efficiency particulate air (HEPA) filters, ultra-low penetration air (ULPA) filters, and/or the like, or any combination thereof.

In some embodiments, the containment enclosure of the present invention is structured to provide a turbulent free airflow environment by moving air (and/or other gases, fluids, aerosols, solids or liquids dispersed in a gas phase, and the like) in a laminar flow (e.g., in a horizontal, vertical or angled pattern with respect to a filter or a housing surface) to maximize containment while minimizing sample loss and balance instability. In some embodiments, in addition to providing improved testing of filters, the containment enclosure is configured to (i) constantly or intermittently monitor each of the filters to determine their efficacy in capturing the predetermined airborne chemical mixtures, (ii) determine current characteristics of the filter such as saturation/concentration of captured substances, absorbance, absorbance, overall filtration efficiency, collection efficiency, remaining lifespan, potential of hydrogen (pH), and the like, (iii) determine current characteristics of the containment enclosure such as presence of a predetermined gas/chemical at a predetermined concentration, air flow, face velocity, and the like, and/or (iv) provide alerts or notifications (e.g., audible alerts) based on identifying that the current characteristics fall below (or exceed) a predetermined optimal range.

The containment enclosures of the present invention may find applications in various environments where chemical mixtures are required to be captured, such as laboratories, hospitals and testing environments. In some embodiments, the containment enclosure, and the filters in particular, are configured to recycle existing room air while cleaning/capturing the chemical mixtures such that no harmful fumes, vapors or particulates are released into the environment. In other words, the containment enclosure is structured to force or draw contaminated air through one or more of the filters, in series and/or in parallel, to remove the chemical mixture from the air before returning or re-circulating the air to the environment (e.g., laboratory environment, environment in the vicinity of the containment enclosure and/or the environment of the room containing the containment enclosure). In some embodiments, the containment enclosures are portable and/or do not require access to or assembly with ducting. Such Ductless hoods have several convenient advantages over laboratory installed, ducted hoods. They are mobile and portable and have minimal installation costs because they do not have to be connected to a duct system. They are environmentally friendly, as no toxic gases are released into the atmosphere. Ductless hoods also have very low operating costs, as no conditioned air is removed from the laboratory and vented outside. Instead, the exhaust air is recirculated through the filter system into the laboratory environment.

FIG. 1 illustrates a containment enclosure apparatus 100, in accordance with embodiments of the invention. Specifically, FIG. 1 illustrates a schematic cut away side view of a containment enclosure apparatus 100, in accordance with an embodiment 102 of the invention.

As illustrated in FIG. 1, the containment enclosure apparatus 100 typically comprises a housing 110. The housing 110 is structured to at least partially enclose or partially surround an enclosure activity compartment 112. In some embodiments, the housing 110 is affixed to a stand (not illustrated). In some embodiments, portions of housing 110 may be manufactured from metals, composites, glass, non-metals, plastics, other organic or inorganic materials which may then be assembled together to form the housing 110, while in other embodiments, the portions may be constructed from a single material. In some embodiments, the containment enclosure is transparent on at least one side or all sides to facilitate ease of viewing. For instance, one or more surfaces surrounding the enclosure activity compartment 112 may be transparent. In some embodiments, the containment enclosure may comprise an opening 114 on at least one side (e.g., the side indicated by arrow "A" in FIG. 1. The opening 114 is structured to allow air (e.g., air surrounding the containment enclosure) into the enclosure activity compartment 112.

Figure 2A:
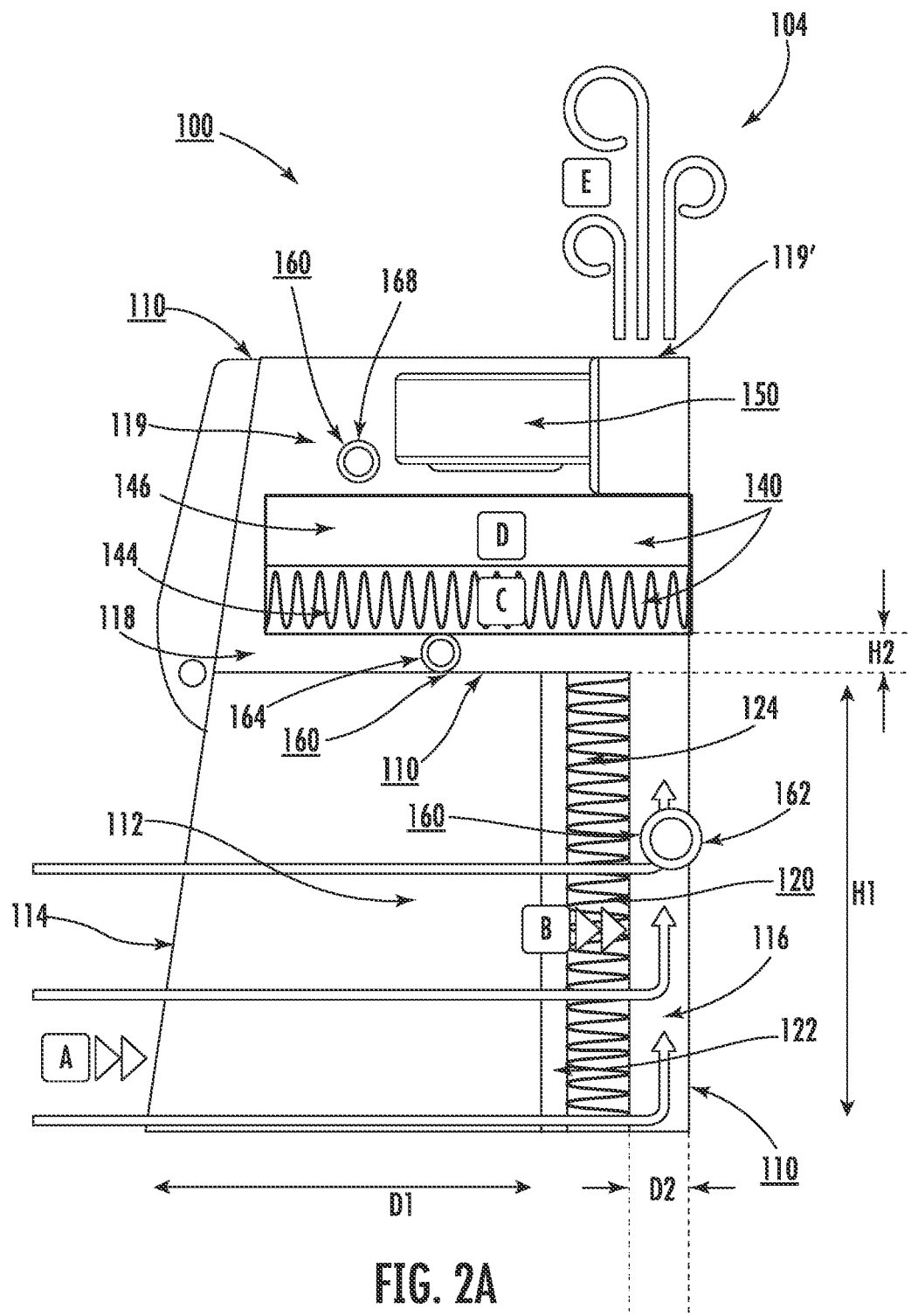
FIG. 2A illustrates a schematic cut away side view of a containment enclosure apparatus 100, in accordance with embodiments of the invention.

The housing 110 typically comprises one or more compartments. In some embodiments, at least a portion of the compartment(s) may be separated from, may be fluidically connected with, and/or may comprise barriers in between adjacent compartments and/or the region external to the containment enclosure apparatus 100. FIG. 1 illustrates the housing 110 having one or more compartments comprising the enclosure activity compartment 112 structured to allow performance of one or more predetermined activities associated with the containment enclosure apparatus 100, and one or more testing compartments (such as, a first testing compartment 116, a second testing compartment 118, a third testing compartment (119, 119'), and/or the like) structured to accommodate at least one port 160 (described below) and to facilitate one or more testing steps described herein. In some embodiments, the "third testing compartment" refers to a testing compartment 119 located downstream of a second filter assembly 140, as illustrated in FIGS. 1-2A. In some embodiments, the "third testing compartment" refers to a testing compartment 119' located downstream of an exhaust a blower device 150, as illustrated in FIGS. 1-2A. In some embodiments, the "third testing compartment" refers to a testing location just outside of the housing 110 where the exhaust of the blower device 150 exits the housing 110. In some embodiments, the one or more compartments of the housing 110 may further comprise one or more filter compartments (not illustrated) that are structured to accommodate one or more filter assemblies (e.g., first filter assembly 120 and/or second filter assembly 140 described below) and/or structured to accommodate one or more filters (e.g., pre-filter 122, primary filter 124, and/or second filter 144 described below) of the filter assemblies. As such, in some embodiments the one or more testing compartments and/or the one or more filter compartments may be the same or separate compartments.

As discussed, the containment enclosure 100 may be a multi-filter assembly. As illustrated by FIG. 1, the containment enclosure 100 comprises a first filter assembly 120 and a second filter assembly 140. In other embodiments, the containment enclosure 100 may comprise a single filter assembly (e.g., the first filter assembly 120 or the second filter assembly 140) or alternatively, the containment enclosure 100 may comprise one or more filter assemblies in addition to the first filter assembly 120 and the second filter assembly 140. "Filter assembly" as used herein refers to an assembly, component or device comprising at least one filter. In some embodiments, the filter assembly may be referred to as a "filter". In some embodiments, the first filter assembly 120 comprises a pre-filter 122 and a primary filter 124. In some embodiment the pre-filter 122 is an electrostatic type filter structured to capture at least a portion of the chemical mixture, while the primary filter 124 is a high efficiency particulate air (HEPA) filter structured to capture at least a portion of the chemical mixture. In some embodiments, the primary filter 124 is an ultra-low penetration air (ULPA) filter. That said, in other embodiments, the primary filter 124 may comprise a bonded carbon filter, an activated carbon filter, a loose carbon filter, a HEPA filter and/or an ULPA filter, or any combination thereof. However, it is understood that the pre-filter 122 and/or the primary filter 124 may be structured to capture predetermined airborne chemical mixtures based on at least one filtration method such as straining, impingement, interception, diffusion, electrostatic attraction, particle filtration, chemical absorption or adsorption, and/or chemical reactions to neutralize the airborne chemical mixtures. It is contemplated that in some embodiments not illustrated herein, the first filter assembly 120 comprises either of the pre-filter 122 or the primary filter 124, while in other embodiments, the first filter assembly 120 comprises additional filters in addition to the pre-filter 122 and the primary filter 124. As alluded to previously, the first filter assembly 120 may be positioned within a first filter compartment of the housing 110 (not illustrated), in some embodiments. The first filter compartment may be utilized to secure the first filter assembly 120, any component therein (e.g., the pre-filter 122, the primary filter 124, and/or other filter) and/or corresponding ports.

Moreover, the first filter assembly 120 defines a first testing compartment 116 downstream of the first filter assembly 120. As illustrated by FIG. 1, the first filter assembly 120 and a surface of the housing 110 define a first testing compartment 116, there between. In some embodiments, the first testing compartment 116 may be at least partially bounded by the housing 110. In some embodiments, the first testing compartment 116 is structured to accommodate at least a portion of at least one port 160. As illustrated, the first filter assembly 120 may be positioned between the enclosure activity compartment 112 and the first testing compartment 116. The enclosure activity compartment 112 is operatively coupled (e.g., fluidically connected, or otherwise allows for the flow of gas/fluid between, or the like) to the first testing compartment 116 through the first filter assembly 120.

Returning to FIG. 1, the second filter assembly 140 comprises a second filter 144. In some embodiment the second filter 144 is a high efficiency particulate air (HEPA) filter structured to capture at least a portion of the chemical mixture, similar to the primary filter 124. That said, in other embodiments, the second filter 144 may comprise a bonded carbon filter, an activated carbon filter, a loose carbon filter, a HEPA filter and/or an ULPA filter, or any combination thereof. In some embodiments, the second filter assembly 140 may be positioned within a second filter compartment of the housing 110 (not illustrated), to secure the second filter assembly 140, any component therein (e.g., second filter 144, and/or other filter) and/or corresponding ports. Moreover, the housing 110 may define a second testing compartment 118 downstream of the first filter assembly 120 and upstream of the second filter assembly 140. The second filter assembly 140 may be arranged such that one end of the second filter assembly overhangs or otherwise extends over the first filter assembly 120, as illustrated.

Moreover, the first testing compartment 116 and the second testing compartment 118 are operatively coupled (e.g., fluidically connected, proximate the overhang portion as indicated by the arrows). As illustrated, in some embodiments, the first testing compartment 116 and the second testing compartment 118 are contiguous and refer to portions of a single compartment. However, the enclosure activity compartment 112 is typically separated from the second testing compartment 118 by the housing 110 such that (i) there is no fluid flow across the housing 110 from the enclosure activity compartment 112 directly into the second testing compartment 118 and (ii) fluid from the enclosure activity compartment 112 may be allowed to flow through the first filter assembly 120 into the first testing compartment 116 and subsequently into the second testing compartment 118 upstream of the second filter assembly 140, as indicated by arrows "B" and "C".

The containment enclosure 100 further comprises a blower device 150 (e.g., provided by the bulk handling provider or by the customer using the containment enclosure 100). The blower device 150 may be a brushless/sparkless blower, another suitable blower, exhaust outside, an exhaust device that is structured for convening/transporting/directing fluids/gases/particulates from the interior of the enclosure 100 to the vicinity outside the enclosure 100, and/or an exhaust device that is structured for exhaust and/or recirculation of fluids/gases/particulates. The blower device 150 is structured to (i) draw in an air stream from the enclosure activity compartment 112 through the filter assemblies (120, 140) and/or (ii) re-circulate filtered air into the atmosphere outside of the containment enclosure 100. Moreover, the containment enclosure 100 comprises a lighting device 180 such as a sealed fluorescent light, an LED light and/or the like. Typically during operation of the containment enclosure 100, external air (or other fluids/gases) enters the enclosure activity compartment 112 (e.g., via opening 14) as indicated by arrow "A" in a laminar manner (e.g., horizontally), where the air may intersperse with chemical mixtures present therein, thereby resulting in contaminated air. The contaminated air stream then passes through the first filter assembly 120 as indicated by arrow "C", where the chemical mixtures may be captured. The air stream then enters the first testing compartment 116 and then passes through the second filter assembly 140 as indicated by labels "C" and "D" where the chemical mixtures may be captured. After the air passes through the second filter assembly 140, the filtered air may then enter a third testing compartment 119 and be subsequently drawn into the blower device 150 (e.g., and further onto the testing compartment 119'), whence it may be re-circulated or exhausted outside, as indicated by label "E". In some embodiments, the first filter assembly 120 comprises a HEPA filter and/or a ULPA filter such that when the contaminated air stream passes through the first filter assembly 120, particulates from the air stream are captured by the filter assembly. In some embodiments, the first filter assembly 120 comprises a carbon filter such that when the contaminated air stream passes through the first filter assembly 120, fumes and/or vapors from the air stream are captured by the filter assembly. In some embodiments, the second filter assembly 140 comprises a HEPA filter and/or a ULPA filter such that when the contaminated air stream passes through the second filter assembly 140, particulates from the air stream are captured by the filter assembly. In some embodiments, the second filter assembly 140 comprises a carbon filter such that when the contaminated air stream passes through the second filter assembly 140, fumes and/or vapors from the air stream are captured by the filter assembly. As such, different types of filters may be configured to capture different components of the chemical mixtures.

The containment enclosure 100 comprises at least one port 160 (also referred to as "one or more ports 160" or "one or more ports" or "port" herein). "Port(s)" as used herein may refer to components, devices or assemblies comprising one or more channels/conduits/manifolds that are structured to convey fluid (e.g., gases, particulates or a combination thereof) from one location to another, and/or devices, components or assemblies comprising one or more of fluidically connected apertures (e.g., pipes/tubes, channels, perforated tubes, ducts, spouts, nozzles, jets, and/or the like). The at least one port 160 typically comprises at least one conduit structured to convey fluid (e.g., gases, particulates or a combination thereof) from one location to another (e.g., between compartments of the housing 110, between locations within a compartment, between an interior of the housing 110 and an exterior of the housing 110, and/or the like). In some embodiments, the at least one conduit comprises an inlet portion structured to receive fluid (e.g., an aperture, opening, orifice etc.) and an outlet portion structured to discharge/output the fluid (e.g., an aperture, opening, orifice etc.), defining a conduit length there between. The at least one conduit may comprise a suitable cross section or shape such as circular, quadrilateral, curvilinear, polygonal shapes and/or a combination of the foregoing. Moreover, the dimensions and/or the shape of the cross section of the at least one conduit may vary along its length, or alternatively may remain constant. In some embodiments, the at least one port 160 may be manufactured from a suitable material such as metals, composites, glass, non-metals, plastics, other organic or inorganic material, or a suitable combination thereof. As such the at least one port may be constructed to be rigid or flexible. In some embodiments, a first portion of the at least one port (e.g., an elongated portion, portions 162*a*, 164*a*, 166*a* illustrated in FIGS. 2C, 2F and 2G) structured for positioning inside the housing 110 comprises a predetermined higher degree of flexibility (e.g., higher or lower rigidity) in comparison with a second portion of the at least one port (e.g., portions 162*b*, 164*b*, 166*b* illustrated in FIGS. 2D and 2H) structured for positioning outside the housing 110. In some embodiments, a first portion of the at least one port (e.g., an elongated portion, portions 164*a*, 166*a* illustrated in FIGS. 2I-2J) structured for positioning inside the housing 110 comprises the same or similar degree of flexibility (e.g., within a predetermine range) as that of a second portion of the at least one port (e.g., portions 164*b*, 166*b* illustrated in FIG. 2I) structured for positioning outside the housing 110.

The at least one port 160 is structured to (i) receive test air from a test air supply and provide/convey/supply the test air upstream of a filter (or filter assembly) to test the filter for leakage and/or (ii) sample test air downstream of a filter (or filter assembly) to determine leakage of the filter (or filter assembly). In some embodiments, the at least one port 160 is also structured to (iii) capture a reference air sample of the test air supplied upstream of the filter (or filter assembly) to facilitate calibration of the testing parameters and/or calibration of input (upstream) and output (downstream) test air properties/characteristics, for determining the leakage of the filter. FIG. 1 illustrates at least one port 160 comprising a port 162 and a port 164. It is understood that, in some embodiments, more or fewer ports may be provided. In some embodiments, the at least one port 160 (such as the port 162 or port 164) is utilized for operative coupling with a testing probe for sampling test air to determine leakage of the first filter assembly 120 when the test air is provided upstream of the first filter assembly 120 and sampled upstream of the second filter assembly 140 through the at least one port. In some embodiments, the at least one port 160 comprising the port 162 or port 164 is structured to sample test air downstream of the first filter assembly 120 to determine leakage of the filter assembly 20.

In some embodiments, the at least one port 160 (such as the port 162 or port 164) is utilized for operative coupling with a test air supply for providing the test air downstream of the first filter assembly 120 in order to sample the test air downstream of the second filter assembly 140 to determine the leakage of the second filter assembly 140. In some embodiments, the at least one port 160 comprising the port 162 and/or the port 164 is structured to receive test air from a test air supply and provide/convey/supply the test air upstream of the second filter assembly 140 to test the second filter assembly 140 for leakage. Here, in some embodiments, the at least one port 160 additionally comprises an auxiliary port (not illustrated in FIG. 1) structured to capture a reference air sample of the test air supplied upstream of the second filter assembly 140 to test the second filter assembly 140 for leakage based on reference air capture through the auxiliary port.

In some embodiments, the at least one port 160 comprising the port 162 and/or the port 164 is structured to (i) receive test air from a test air supply and provide/convey/supply the test air upstream of the second filter assembly 140 to test the second filter assembly 140 for leakage and (ii) sample test air downstream of the first filter assembly 120 to determine leakage of the first filter assembly 120.

Figure 2B:
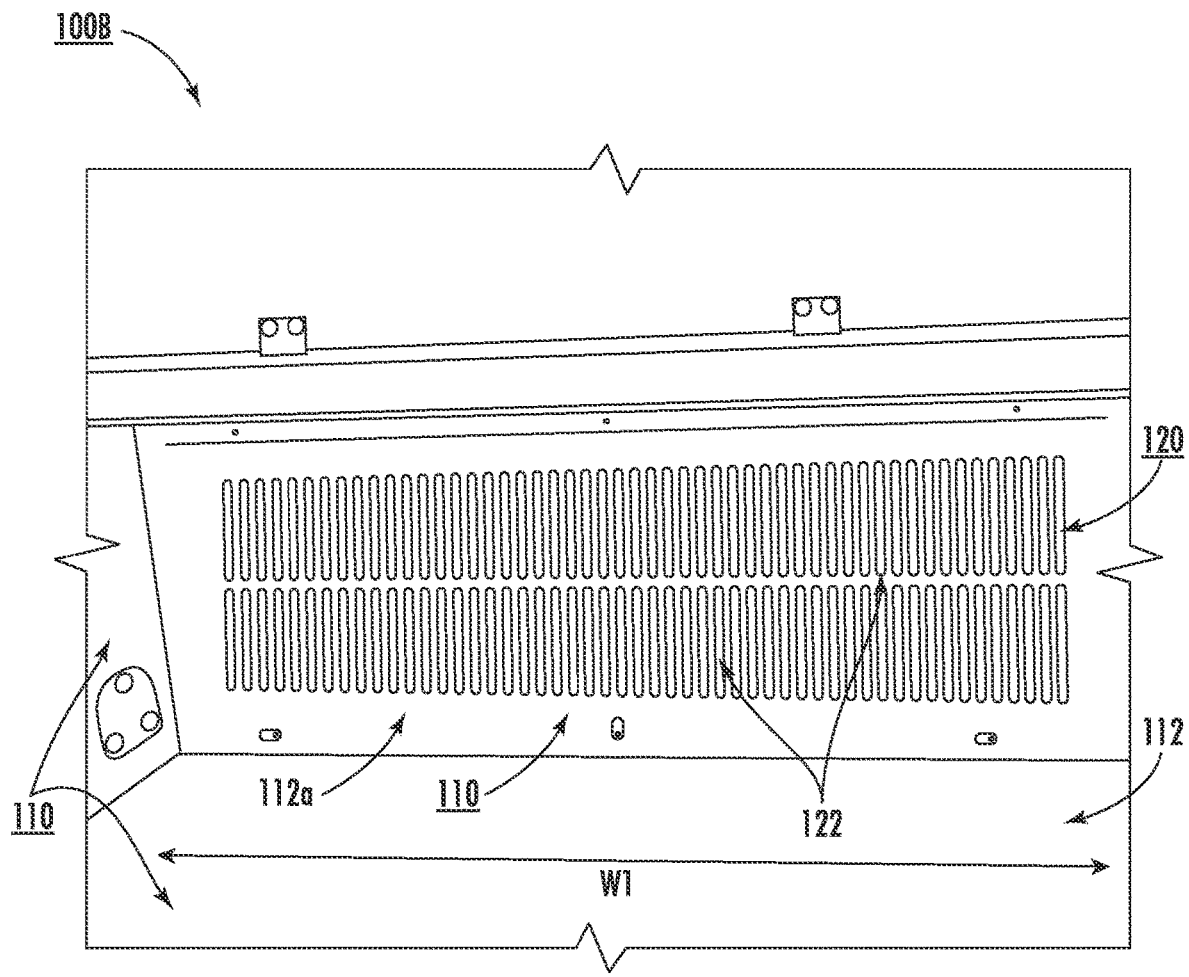
FIG. 2B illustrates a front view 100B of the containment enclosure apparatus 100, in accordance with embodiments of the invention.

FIGS. 2A-2B illustrate a containment enclosure apparatus 100, in accordance with embodiments of the invention. Specifically, FIG. 2A illustrates a schematic cut away side view of a containment enclosure apparatus 100, in accordance with embodiment 104 of the invention. FIG. 2B illustrates a front view 100B of the containment enclosure apparatus 100, in accordance with embodiments of the invention. The features, components and functions of embodiment 104 of the containment enclosure apparatus 100 illustrated in FIGS. 2A-2B is substantially similar to those described above with respect to embodiment 102 of the containment enclosure apparatus 100 of FIG. 1. As used herein, unless specified otherwise, the "containment enclosure apparatus 100" may refer to the embodiment 102 and/or the embodiment 104 of the containment enclosure apparatus 100.

As illustrated in FIGS. 2A-2B, the containment enclosure apparatus 100 typically comprises a housing 110. The housing 110 may be similar to the housing 110 described previously. The housing 110 is structured to at least partially enclose or partially surround an enclosure activity compartment 112. The enclosure activity compartment 112 may comprise a height H1, a depth D1 and a width W1 (illustrated in FIG. 2B), which may be constant or variable. In some embodiments, the housing 110 is affixed to a stand (not illustrated). As discussed previously, in some embodiments, portions of housing 110 may be manufactured from metals, composites, glass, non-metals, plastics, other organic or inorganic materials which may then be assembled together to form the housing 110, while in other embodiments, the portions may be constructed from a single material. In some embodiments, the containment enclosure is transparent on at least one side or all sides to facilitate ease of viewing. For instance, one or more surfaces surrounding the enclosure activity compartment 112 may be transparent. In some embodiments, the containment enclosure may comprise an opening 114 on at least one side (e.g., the side indicated by arrow "A" in FIG. 2A). The opening 114 is structured to allow air (e.g., air surrounding the containment enclosure)

into the enclosure activity compartment 112, similar to the opening 114 and enclosure activity compartment 112 described previously.

The housing 110 typically comprises one or more compartments. In some embodiments, at least a portion of the compartment(s) may be separated from, may be fluidically connected with, and/or may comprise barriers in between adjacent compartments and/or the region external to the containment enclosure apparatus 100. FIG. 2A illustrates the housing 110 having one or more compartments comprising the enclosure activity compartment 112 structured to allow performance of one or more predetermined activities associated with the containment enclosure apparatus 100, and one or more testing compartments (such as, a first testing compartment 116, a second testing compartment 118, a third testing compartment (119, 119') and/or the like) structured to accommodate at least one port 160 (described below) and to facilitate one or more testing steps described herein. In some embodiments, the one or more compartments of the housing 110 may further comprise one or more filter compartments (not illustrated) that are structured to accommodate one or more filter assemblies (e.g., first filter assembly 120 and/or second filter assembly 140 described below) and/or structured to accommodate one or more filters (e.g., pre-filter 122, primary filter 124, second filter 144 and/or vapor filter 146 described below) of the filter assemblies.

As discussed, the containment enclosure 100 may be a multi-filter assembly. As illustrated by FIG. 2A, the containment enclosure 100 comprises a first filter assembly 120 and a second filter assembly 140. In other embodiments not illustrated herein, the containment enclosure 100 may comprise a single filter assembly (e.g., the first filter assembly 120 or the second filter assembly 140) or alternatively, the containment enclosure 100 may comprise one or more filter assemblies in addition to the first filter assembly 120 and the second filter assembly 140. "Filter assembly" as used herein refers to an assembly, component or device comprising at least one filter. In some embodiments, the filter assembly may be referred to as a "filter".

As illustrated by FIG. 2A, the first filter assembly 120 may be oriented perpendicularly (or at a suitable angle with) with respect to the depth D1 of the enclosure activity compartment 112. In some embodiments, the first filter assembly 120 comprises a pre-filter 122 and a primary filter 124, similar to the pre-filter 122 and primary filter 124 of the first filter assembly 120 described previously. In some embodiment the pre-filter 122 is an electrostatic type filter structured to capture the chemical mixture, while the primary filter 124 is a high efficiency particulate air (HEPA) filter structured to capture the chemical mixture. In some embodiments, the primary filter 124 is an ultra-low penetration air (ULPA) filter. That said, in other embodiments, the primary filter 124 may comprise a bonded carbon filter, an activated carbon filter, a loose carbon filter, a HEPA filter and/or an ULPA filter, or any combination thereof. However, it is understood that the pre-filter 122 and/or the primary filter 124 may be structured to capture predetermined airborne chemical mixtures based on at least one filtration method such as straining, impingement, interception, diffusion, electrostatic attraction, particle filtration, chemical absorption or adsorption, and/or chemical reactions to neutralize the airborne chemical mixtures. In some embodiments, the first filter assembly 120 comprises either of the pre-filter 122 or the primary filter 124, while in other embodiments, the first filter assembly 120 comprises additional filters in addition to the pre-filter 122 and the primary filter 124. In some embodiments, the pre-filter 122 and the primary filter 124 are affixed to each other, while in other embodiments, the pre-filter 122 and the primary filter 124 are detachable, for example, for testing each of them individually. It is contemplated that in some embodiments not illustrated herein, the first filter assembly 120 comprises either of the pre-filter 122 or the primary filter 124, while in other embodiments, the first filter assembly 120 comprises additional filters in addition to the pre-filter 122 and the primary filter 124. As alluded to previously, the first filter assembly 120 may be positioned within a first filter compartment of the housing 110 (not illustrated), in some embodiments. The first filter compartment may be utilized to secure the first filter assembly 120, any component therein (e.g., the pre-filter 122, the primary filter 124, and/or other filter) and/or corresponding ports.

Moreover, the first filter assembly 120 defines a first testing compartment 116 downstream of the first filter assembly 120. As illustrated by FIG. 2A, the first filter assembly 120 and a surface of the housing 110 define a first testing compartment 116 having a depth D2, there between. In some embodiments, the first testing compartment 116 may be at least partially bounded by the housing 110. In some embodiments, the first testing compartment 116 is structured to accommodate at least a portion of at least one port 160. As illustrated, the first filter assembly 120 may be positioned between the enclosure activity compartment 112 and the first testing compartment 116. Moreover, in some embodiments of the invention first filter compartment may be a part of and included within the first testing compartment 116. The enclosure activity compartment 112 is operatively coupled (e.g., fluidically connected, or otherwise allows for the flow of gas/fluid between, or the like) to the first testing compartment 116 through the first filter assembly 120.

Continuing to refer to FIG. 2A, the second filter assembly 140 comprises a second filter 144 and a vapor filter 146. In some embodiment the second filter 144 (similar to the second filter 144 described previously) is a high efficiency particulate air (HEPA) filter structured to capture the chemical mixture, while the vapor filter 146 is a bonded carbon filtration bed type filter structured to capture the chemical mixture such as chemical vapors and/or chemical fumes. That said, in other embodiments, the second filter 144 and/or the vapor filter 146 may each comprise a bonded carbon filter, an activated carbon filter, a loose carbon filter, a HEPA filter and/or an ULPA filter, or any combination thereof. However, it is understood that the second filter 144 and/or the vapor filter 146 may be structured to capture predetermined airborne chemical mixtures based on at least one filtration method such as straining, impingement, interception, diffusion, electrostatic attraction, particle filtration, chemical absorption or adsorption, and/or chemical reactions to neutralize the airborne chemical mixtures. In some embodiments, the second filter 144 and the vapor filter 146 are affixed to each other, while in other embodiments, the second filter 144 and the vapor filter 146 are detachable, for example, for testing each of them individually. In some embodiments, the second filter assembly 140 comprises either of the second filter 144 and/or the vapor filter 146 (e.g., the embodiment 102 associated with the containment enclosure apparatus 100 of FIG. 1), while in other embodiments, the second filter assembly 140 comprises additional filters in addition to, or in lieu of, the second filter 144 and/or the vapor filter 146.

As illustrated by FIG. 2A, the second filter assembly 140 may be oriented perpendicularly (or at a suitable angle with) to the first filter assembly 120. Alternatively, it is contemplated that the second filter assembly 140 may be oriented in parallel with the first filter assembly 120, in other embodiments not illustrated herein. The second filter assembly 140 may be arranged such that one end of the second filter assembly overhangs or otherwise extends over the first filter assembly 120, as illustrated. In some embodiments, the second filter assembly 140 may be positioned within a second filter compartment of the housing 110 (not illustrated), to secure the second filter assembly 140, any component therein (e.g., second filter 144, and/or other filter) and/or corresponding ports.

Moreover, the second filter assembly 140 defines a second testing compartment 118 having a height H2, upstream of the second filter assembly 140 and downstream of the first filter assembly 120. The second filter assembly 140 may be arranged such that one end of the second filter assembly overhangs or otherwise extends (e.g., by the dimension D2) over the first filter assembly 120, as illustrated by FIG. 2A. It should be understood that a second filter compartment may be located before or is incorporated within the second testing compartment 118.

Moreover, the first testing compartment 116 and the second testing compartment 118 are operatively coupled (e.g., fluidically connected, proximate the overhang portion as indicated by the arrows). As illustrated, in some embodiments, the first testing compartment 116 and the second testing compartment 118 are contiguous and refer to portions of a single compartment. However, the enclosure activity compartment 112 is typically separated from the second testing compartment 118 by the housing 110 such that (i) there is no fluid flow across the housing 110 from the enclosure activity compartment 112 directly into the second testing compartment 118 and (ii) fluid from the enclosure activity compartment 112 may be allowed to flow through the first filter assembly 120 into the first testing compartment 116 and subsequently into the second testing compartment 118 upstream of the second filter assembly 140, as indicated by label "B" and arrows.

The containment enclosure 100 further comprises a blower device 150 (e.g., provided by the bulk handling provider or by the customer using the containment enclosure 100). The blower device 150 may be a brushless/sparkless blower or another suitable blower. The blower device 150 is structured to (i) draw in an air stream from the enclosure activity compartment 112 through the filter assemblies (120, 140) and/or (ii) re-circulate filtered air into the atmosphere outside of the containment enclosure. Typically during operation of the containment enclosure 100, external air (or other fluids/gases) enters the enclosure activity compartment 112 (e.g., via opening 114) as indicated by arrow "A" in a laminar manner (e.g., horizontally), where the air may intersperse with chemical mixtures present therein, thereby resulting in contaminated air. The contaminated air stream then passes through the first filter assembly 120 as indicated by arrow "B", where the chemical mixtures may be captured. The air stream then enters the first testing compartment 116 and then passes through the second filter assembly 140 as indicated by labels "C" and "D" where the chemical mixtures may be captured. After the air passes through the second filter assembly 140, the filtered air may then enter the third testing compartment 119 and be subsequently drawn into the blower device 150 (e.g., and further onto the testing compartment 119'), whence it may be re-circulated or exhausted outside, as indicated by label "E". As such, different components of the chemical mixture may be captured by various filters.

The containment enclosure 100 comprises at least one port 160 (also referred to as "one or more ports 160" or "one or more ports" or "port" herein). "Port(s)" as used herein may refer to components, devices or assemblies comprising one or more channels/conduits/manifolds that are structured to provide/convey/supply fluid (e.g., gases, particulates or a combination thereof) from one location to another and/or devices, components or assemblies comprising one or more of fluidically connected apertures (e.g., pipes/tubes, channels, perforated tubes, ducts, spouts, nozzles, jets, and/or the like). The at least one port 160 typically comprises at least one conduit structured to convey fluid (e.g., gases, particulates or a combination thereof) from one location to another (e.g., between compartments of the housing 110, between locations within a compartment, between an interior of the housing 110 and an exterior of the housing 110, and/or the like). In some embodiments, the at least one conduit comprises an inlet portion structured to receive fluid (e.g., an aperture, opening, orifice etc.) and an outlet portion structured to discharge/output the fluid (e.g., an aperture, opening, orifice etc.), defining a conduit length there between. The at least one conduit may comprise a suitable cross section or shape such as circular, quadrilateral, curvilinear, polygonal shapes and/or a combination of the foregoing. Moreover, the dimensions and/or the shape of the cross section of the at least one conduit may vary along its length, or alternatively may remain constant. The at least one port 160 is structured to (i) receive test air from a test air supply and provide/convey/supply the test air upstream of a filter (or filter assembly) to test the filter for leakage and/or (ii) sample test air downstream of a filter (or filter assembly) to determine leakage of the filter (or filter assembly). In some embodiments, the at least one port 160 is also structured to (iii) capture a reference air sample of the test air supplied upstream of the filter (or filter assembly) to facilitate calibration of the testing parameters and/or calibration of input (upstream) and output (downstream) test air properties/characteristics, for determining the leakage of the filter. In some embodiments, the at least one port 160 comprises a port 162 and/or a port 164 (illustrated in FIG. 2A). It is understood that, in some embodiments, more or fewer ports may be provided. For instance, in some embodiments, at least one port 160 comprises a port 168, as illustrated by FIG. 2A. Port 162 will be described in detail with respect to FIGS. 2C-2E and port 164 will be described in detail with respect to FIGS. 2F-2H later on.

In some embodiments, the at least one port 160 (such as the port 162 or port 164) is utilized for operative coupling with a testing probe for sampling test air to determine leakage of the first filter assembly 120 when the test air is provided upstream of the first filter assembly 120 and sampled upstream of the second filter assembly 140 through the at least one port. In some embodiments, the at least one port 160 comprising the port 162 or port 164 is structured to sample test air downstream of the first filter assembly 120 to determine leakage of the filter assembly 120.

In some embodiments, the at least one port 160 (such as the port 162 or port 164) is utilized for operative coupling with a test air supply for providing the test air downstream of the first filter assembly 120 in order to sample the test air downstream of the second filter assembly 140 to determine the leakage of the second filter assembly 140. In some embodiments, the at least one port 160 comprising the port 162 and/or the port 164 is structured to receive test air from a test air supply and provide/convey/supply the test air upstream of the second filter assembly 140 to test the second filter assembly 140 for leakage.

In some embodiments, the at least one port 160 comprising the port 162 and/or the port 164 is structured to (i)

receive test air from a test air supply and provide/convey/ supply the test air upstream of the second filter assembly 140 to test the second filter assembly 140 for leakage and (ii) sample test air downstream of the first filter assembly 120 to determine leakage of the first filter assembly 120. Here, in some embodiments, the at least one port 160 additionally comprises an auxiliary port 166 (illustrated at FIGS. 2G-2H) structured to capture a reference air sample of the test air supplied upstream of the second filter assembly 140 to test the second filter assembly 140 for leakage.

In some embodiments, the at least one port 160 comprising the auxiliary port 166 is structured to sample test air downstream of the second filter assembly 140 to determine leakage of the second filter assembly 140. Alternatively, the test air downstream of the second filter assembly 140 may be sampled at the exhaust of the blower device 150 as indicated by label "E".

Now referring to FIG. 2B, in some embodiments, the housing 110 may comprise first intake housing portion 112*a* proximate the first filter assembly 120 and the pre-filter 122 in particular. The first intake housing portion 112*a* may comprise one or more apertures to facilitate flow of an airstream (e.g., air containing a chemical mixture) from the enclosure activity compartment 112 into the first filter assembly 120 (e.g., located within the first filter compartment in some embodiments), and subsequently into the first testing compartment 116 (illustrated in FIG. 2A). In some embodiments the first intake housing portion 112*a* is detachable from the rest of the housing 110 (e.g., a removable grate, or the like).

FIGS. 2C-2E illustrate a containment enclosure apparatus 100 having at least one port comprising the port 162, in accordance with one embodiment of the invention. Specifically, FIG. 2C illustrates a perspective sectional view 100C of the containment enclosure apparatus 100, in accordance with embodiments of the invention. FIG. 2D illustrates a perspective side view 100D of the containment enclosure apparatus 100, in accordance with embodiments of the invention. FIG. 2E illustrates a side view 100E of the containment enclosure apparatus 100, in accordance with embodiments of the invention.

The at least one port 160 comprising the port 162 is structured for testing of the first filter assembly 120 (or single filter thereof, individually) and/or the second filter assembly 140 (or single filter thereof, individually). Typically, the port 162 is operatively coupled downstream of the first filter assembly 120 and upstream of the second filter assembly 140. In some embodiments, the port 162 is positioned at least partially within the first testing compartment 116, or in other words at least a portion of the port 162 is positioned within the first testing compartment 116. In some embodiments, a first portion 162*a* of the port 162 may be positioned entirely within the first testing compartment 116 downstream of the first filter assembly 120 and upstream of the second filter assembly 140. Although illustrated as extending into the first testing compartment 116, in other embodiments, the first portion 162*a* of the port 162 may be positioned proximate the first testing compartment, such that the first portion 162*a* terminates proximate an interface between the housing 110 and the first testing compartment 116 (e.g., terminates proximate the label T1 instead of extending into the first testing compartment 116). In some embodiments, a second portion 162*b* of the port 162 may be positioned external to the housing 110 or proximate an external surface of the housing 110, as illustrated by FIGS. 2D and 2E. As such, the first portion 162*a* and the second portion 162*b* of the port 162 are operatively coupled (e.g., fluidically connected) to convey fluids (e.g., liquids, gases, particulates or a combination thereof) from the first testing compartment 116 (via the first portion 162*a*) to a region external to the housing 110 (via the second portion 162*b*), and vice versa. In some embodiments, the port 162 may further comprise one or more apertures 162*c* provided within or proximate the first testing compartment 116 (e.g., at the first portion 162*a*) that are structured to convey fluids from the first testing compartment 116 into at least one conduit of the port 162 for subsequent transfer to the second portion 162*b*, and vice versa. The one or more apertures 162*c* may comprise a suitable size and shape (e.g., circular, curvilinear, polygonal, etc.).

Figure 4A:
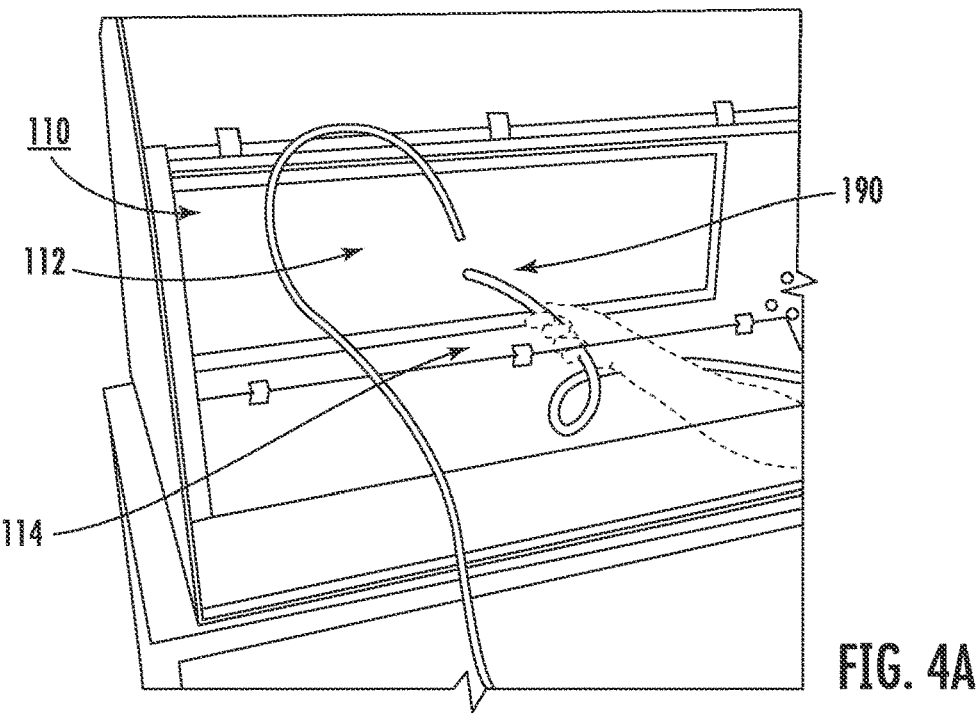
FIGS. 4A-4D illustrates steps of testing multiple filters assembled in a containment enclosure in accordance with the high level process flow 300 of FIG. 3.
Figure 4B:
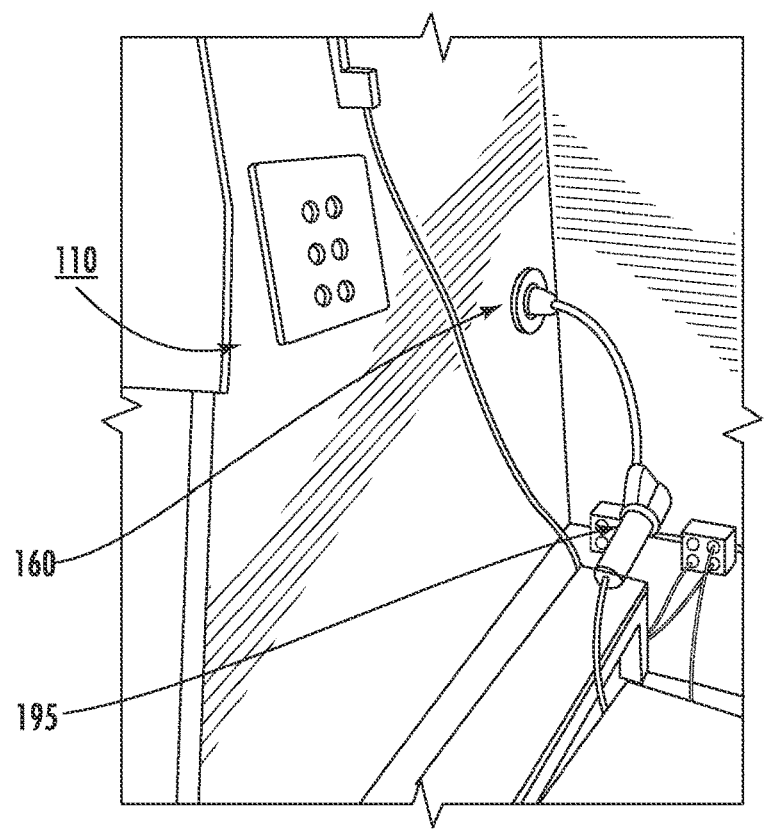

In some embodiments, the port 162 is structured to be operatively coupled to a testing probe 195 (e.g., a photometer, or the like) at the second portion 162*b*, as illustrated by FIG. 2E. Specifically, test air is provided upstream of the first filter assembly 120 (e.g., as illustrated by FIG. 4A) and subsequently the port 162 is utilized for operative coupling with the testing probe 195 for sampling test air through the port 162, downstream of the first filter assembly 120 to determine leakage of the first filter assembly 120, in some embodiments. Here, test air downstream of the first filter assembly 120 may be received into a conduit of the port 162 via the one or more apertures 162*c* and/or an open end of the first portion 162*a*, and the received test air may then be transported to the second portion 162*b* where it is sampled and/or analyzed by the testing probe 195.

In some embodiments, the port 162 is utilized for operative coupling with a test air supply (e.g., at second portion 162*b*) for providing the test air upstream of the second filter assembly 140 (e.g., via the one or more apertures 162*c* and/or an open end of the first portion 162*a*), in order to sample the test air downstream of the second filter assembly 140 to determine the leakage of the second filter assembly 140. In other words, test air received at the second portion 162*b* from the test air supply may be transported to various locations upstream of the second filter assembly via the one or more apertures 162*c* and/or an open end of the first portion 162*a*.

In some embodiments, the port 162 is structured to both (i) receive test air from a test air supply and provide/convey/ supply the test air upstream of the second filter assembly 140 to test the second filter assembly 140 for leakage and (ii) sample test air downstream of the first filter assembly 120 to determine leakage of the first filter assembly 120. Here, in some instances, the port 162 comprises a single conduit configured to both (i) receive test air from a test air supply at the second portion 162*b* and provide/convey/supply the test air upstream of the second filter assembly 140 via the one or more apertures 162*c* and/or an open end of the first portion 162*a* and (ii) sample test air downstream of the first filter assembly 120, via the one or more apertures 162*c* and/or an open end of the first portion 162*a* and convey the same to the second portion 162*b*. In other words, direction of flow within the conduit may be reversed. Alternatively, in some embodiments, the second portion 162*b* branches in to two conduits (first portions) inside the first testing compartment 116, each conduit facilitating flow in opposite directions. Specifically, the branched port is structured such that test air from the test air supply at the second portion 162*b* is conveyed to one conduit for subsequent supply upstream of the second filter assembly 140 in a first flow direction, while the other conduit is structured to sample test air downstream of the first filter assembly and convey the same to the second portion 162*b* for testing in a second flow direction opposite the first flow direction. In such instances, the port may substantially comprise a "Y" branched shape, and the second portion 162b is structured to allow switching between the conduits and the associated flow directions.

In some embodiments, the at least one port 160 comprises one or more intra-filter ports, similar to that described above, which are positioned at least partially between the pre-filter 122 and the primary filter 124, such that at least a portion of the intra-filter port is positioned between the pre-filter 122 and the primary filter 124 to facilitate testing of the pre-filter 122 or the primary filter 124 individually. The structure and functions of the one or more intra-filter ports are similar to that of the port 162 described above.

Figure 2F:
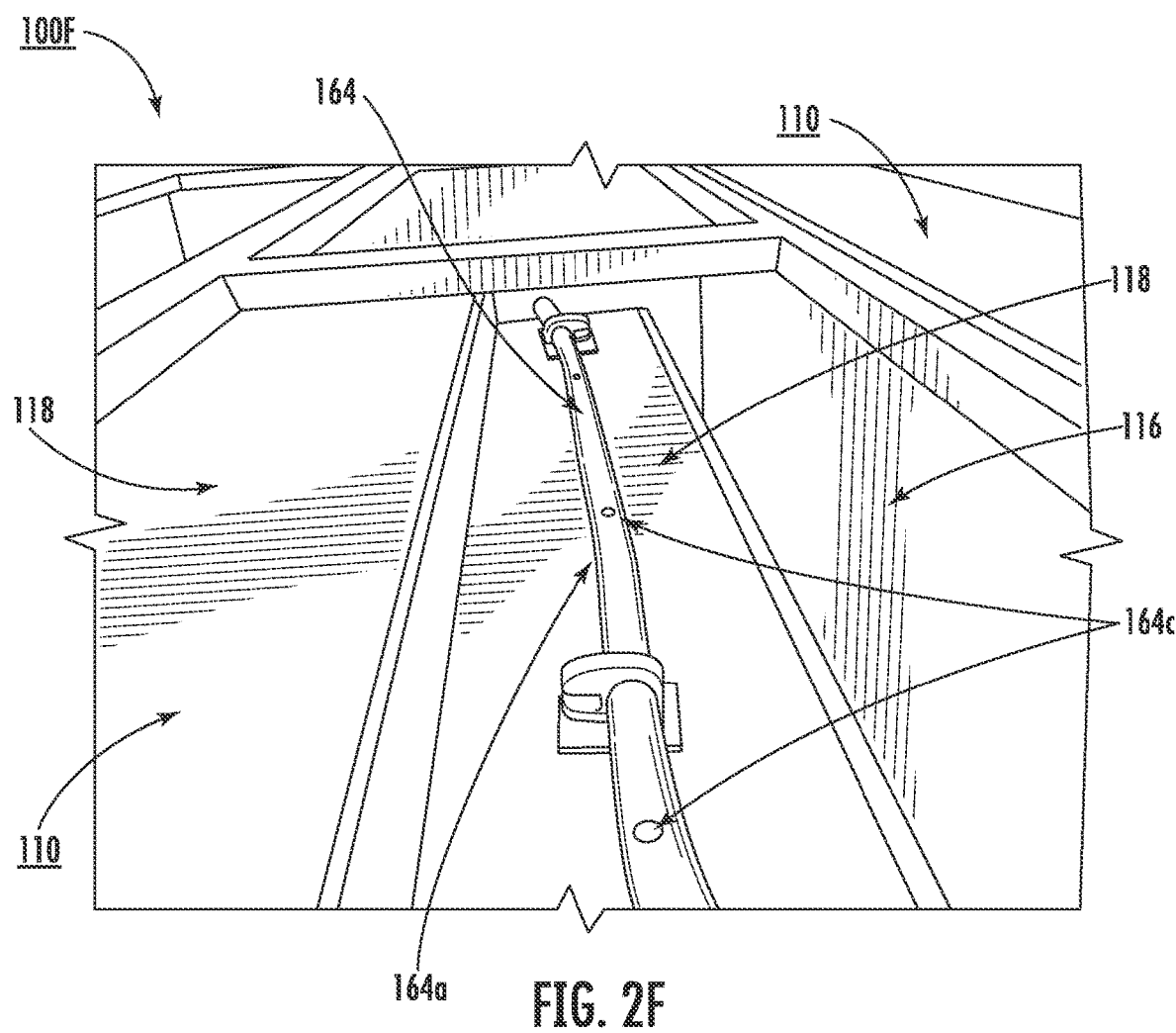
FIG. 2F illustrates a perspective sectional view 100F of the containment enclosure apparatus 100, in accordance with embodiments of the invention.
Figure 2G:
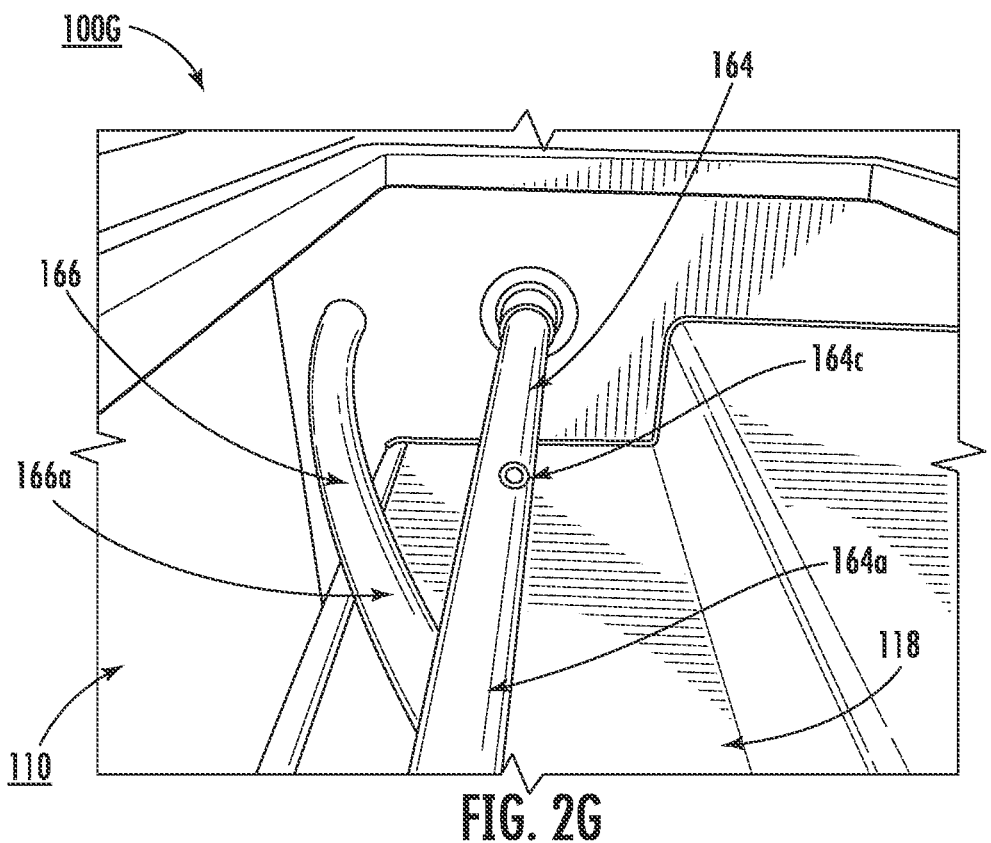
FIG. 2G illustrates a perspective sectional view 100G of the containment enclosure apparatus 100, in accordance with embodiments of the invention.
Figure 2H:
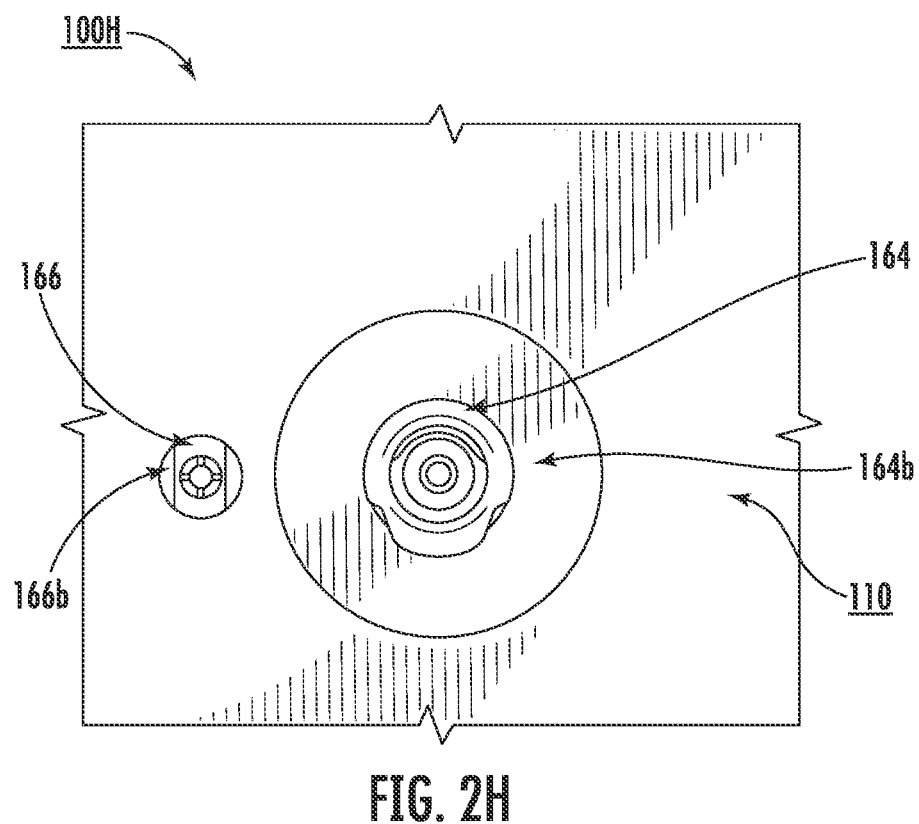
FIG. 2H illustrates a side view 100H of embodiments illustrated in FIG. 2G.
Figure 2J:
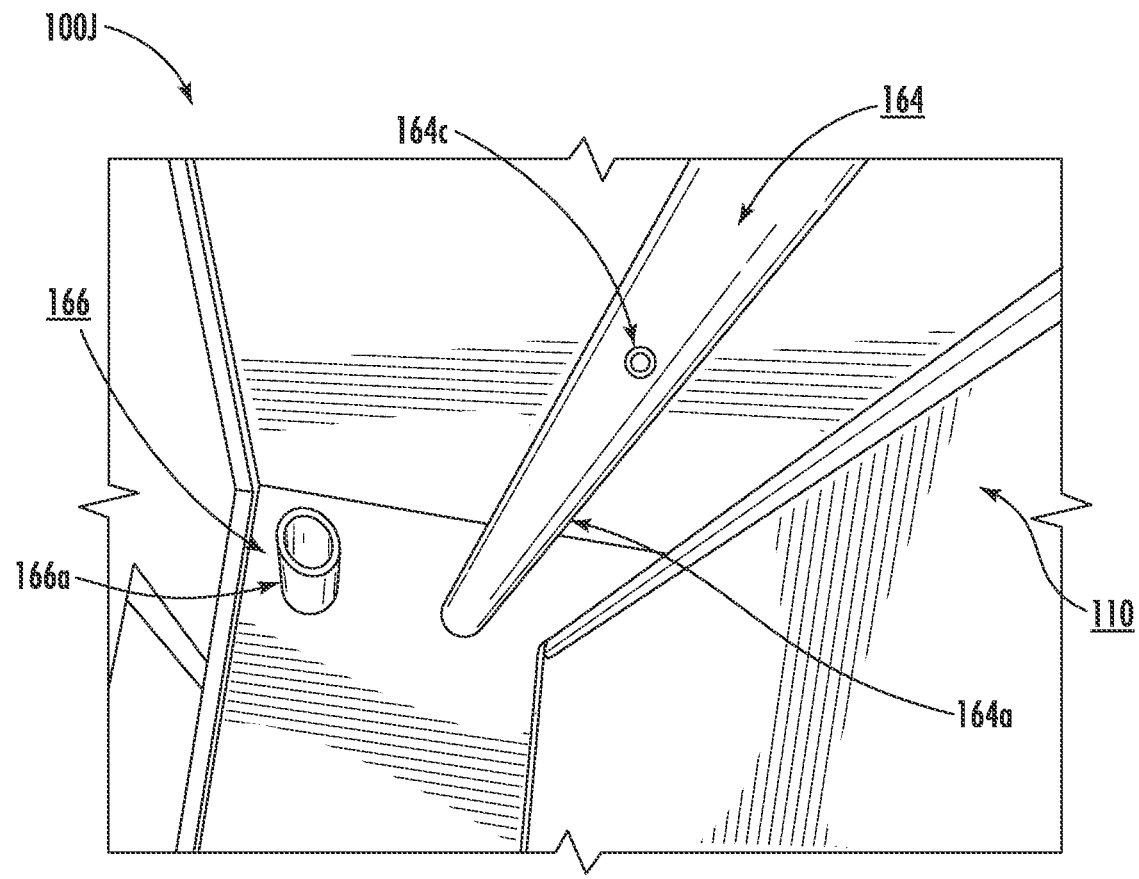
FIG. 2J illustrates a perspective sectional view 100J of the containment enclosure apparatus 100, in accordance with embodiments of the invention.

FIGS. 2F-2J illustrate a containment enclosure apparatus 100 having at least one port comprising the port 164, in accordance with one embodiment of the invention. Specifically, FIG. 2F illustrates a perspective sectional view 100F of the containment enclosure apparatus 100, in accordance with one embodiment of the invention. FIG. 2G illustrates a perspective sectional view 100G of the containment enclosure apparatus 100, in accordance with embodiments of the invention. FIG. 2H illustrates a side view 100H of the embodiment illustrated in FIG. 2G. FIG. 2I illustrates a perspective exploded view 100I of ports 164 and 166, in accordance with embodiments of the invention. FIG. 2J illustrates a perspective sectional view 100J of the containment enclosure apparatus 100, in accordance with embodiments of the invention.

The port 164 may be structured for testing of the first filter assembly 120 and/or the second filter assembly 140. Typically, the port 164 is operatively coupled downstream of the first filter assembly 120 and upstream of the second filter assembly 140. In some embodiments, the port 164 is positioned at least partially within the second testing compartment 118, or in other words at least a portion of the port is positioned within the second testing compartment 118. In some embodiments, a first portion 164a of the port 164 may be positioned within the second testing compartment 118 downstream of the first filter assembly 120 and upstream of the second filter assembly 140. Although illustrated as extending into the second testing compartment 118, in other embodiments, the first portion 164a of the port 164 may be positioned proximate the first testing compartment, such that the first portion 164a terminates proximate an interface between the housing 110 and the second testing compartment 118. In some embodiments, a second portion 164b (illustrated in FIG. 2H) of the port 164 may be positioned external to the housing 110 or proximate an external surface of the housing 110. As such, the first portion 164a and the second portion 164b of the port 164 are operatively coupled (e.g., fluidically connected) to convey fluids (e.g., liquids, gases, particulates or a combination thereof) from the second testing compartment 118 and/or the fluidically connected first testing compartment 116 (via the first portion 164a) over to a region external to the housing 110 (via the second portion 164b), and vice versa. In some embodiments, the port 164 may further comprise one or more apertures 164c provided within or proximate the second testing compartment 118 (e.g., at the first portion 164a) that are structured to convey fluids from the second testing compartment 118 into a cavity/channel of the port 164 for subsequent transfer to the second portion 164b and vice versa. In some embodiments, the port 164 is structured to be coupled to a testing probe 195 (e.g., a photometer, such as that illustrated in FIG. 2E).

In some embodiments, the at least one port 160 comprises one or more intra-filter ports, similar to that described above, which are positioned at least partially between the filter 144 and the gas filter 146 of the second filter assembly 140, to facilitate testing of the second filter 144 or the vapor filter 146 individually. The structure and functions of the one or more intra-filter ports are similar to that of the port 164 described herein.

In some embodiments, the port 164 is utilized to convey fluids (e.g., test air comprising predetermined liquids, gases, particulates or a combination thereof) in one direction only. Here, in some embodiments, the port 164 (also referred to as a "supply port") is utilized to receive fluids from a region external to the housing 110 (from a test air dispensing device 190 positioned at the second portion 164b) and subsequently convey the fluid to the second testing compartment 118 (via the first portion 164a and/or the one or more apertures 164c) to test the second filter assembly 140. In some embodiments, test air downstream of the first filter assembly 120 may be received into a conduit of the port 164 via the one or more apertures 164c and/or an open end of the first portion 164a, and the received test air may then be transported to the second portion 164b where it is sampled and/or analyzed by the testing probe 195.

In some embodiments, the port 164 is utilized to convey fluids (e.g., test air comprising predetermined liquids, gases, particulates or a combination thereof) in multiple directions. Here, the port 164 is structured to both (i) receive test air from a test air supply and provide/convey/supply the test air upstream of the second filter assembly 140 to test the second filter assembly 140 for leakage and (ii) sample test air downstream of the first filter assembly 120 to determine leakage of the first filter assembly 120. Here, in some instances, the port 164 comprises a single conduit configured to both (i) receive test air from a test air supply at the second portion 164b and provide/convey/supply the test air upstream of the second filter assembly 140 via the one or more apertures 164c and/or an open end of the first portion 164a and (ii) sample test air downstream of the first filter assembly 120, via the one or more apertures 164c and/or an open end of the first portion 164a and convey the same to the second portion 164b. In other words, direction of flow within the conduit may be reversed. Alternatively, in some embodiments, the second portion 164b branches in to two conduits (two first portions) inside the second testing compartment 118, each conduit facilitating flow in opposite directions. Specifically, the branched port 164 is structured such that test air from the test air supply at the second portion 164b is conveyed to one conduit for subsequent supply upstream of the second filter assembly 140 in a first flow direction, while the other conduit is structured to sample test air downstream of the first filter assembly and convey the same to the second portion 162b for testing in a second flow direction opposite the first flow direction. In such instances, the port may substantially comprise a "Y" branched shape, and the second portion 164b is structured to allow switching between the conduits and the associated flow directions.

In some embodiments, the at least one port may further comprise an auxiliary port 166 whose structure is substantially similar to that of the ports described herein. Similar to the ports described above, a first portion 166a of the auxiliary port 166 may be positioned within or proximate to the second testing compartment 118 downstream of the first filter assembly 120 and upstream of the second filter assembly 140. The auxiliary port 166 further comprises a second portion 166b (illustrated in FIG. 2H) that may be positioned external to the housing 110 or proximate an external surface of the housing 110, the second portion 166b being is structured to be coupled to the testing probe 195 (e.g., a photometer, such as that illustrated in FIG. 2E). The auxiliary port 166 may comprise the same length or a different length than the port 162 or the port 164.

In some embodiments, the auxiliary port 166 is utilized for determining a reference point of the test air (via reference air sample) provided upstream of the second filter assembly 140 (e.g., provided by the port 162, the port 164 or another supply port) to help facilitating calibration of the testing parameters and/or calibration of input (upstream) and output (downstream) test air properties/characteristics, for determining the leakage of the filter. In such instances, the auxiliary port is referred to as a "reference port". Alternatively, in other embodiments, the auxiliary port 166 may be utilized to convey fluids from the second testing compartment 118 and/or the fluidically connected first testing compartment 116 (via the first portion 166a) over to a region external to the housing 110 (via the second portion 166b), e.g., to the testing probe 195. In such instances, the auxiliary port is referred to as a "sampling port".

In some embodiments, "at least one port" or "at least one port 160" refers to the port 164. In some embodiments, "at least one port" or "at least one port 160" refers to the port 162. In some embodiments, "at least one port" refers to the port 162, the port 164 and/or the auxiliary port 166. As such, the at least one port 160 allows for leak testing of the first filter assembly 120 and the second filter assembly 140 without having to remove the first filter assembly 120 and the second filter assembly 140 from the containment enclosure 100. In some embodiments, the at least one port 160 is positioned in the containment enclosure 100 such that the at least one port is operatively coupled downstream of the first filter assembly 120 and upstream of the second assembly 140. The at least one port 160 is utilized for operative coupling with a testing probe 195 for sampling test air (e.g., gases, fluids, particulates or a combination thereof) to determine leakage of the first filter assembly 120 when the test air is provided upstream of the first filter assembly 120 and sampled upstream of the second filter assembly 140 through the at least one port 160. Moreover, the at least one port 160 is utilized for operative coupling with a test air supply for providing the test air downstream of the first filter assembly 120 in order to sample the test air downstream of the second filter assembly 140 to determine the leakage of the second filter assembly 140 through the at least one port. The method of testing the first filter assembly 120 and the second filter assembly 140, in situ within the containment enclosure 100, is described below, in accordance with some embodiments.

Figure 3:
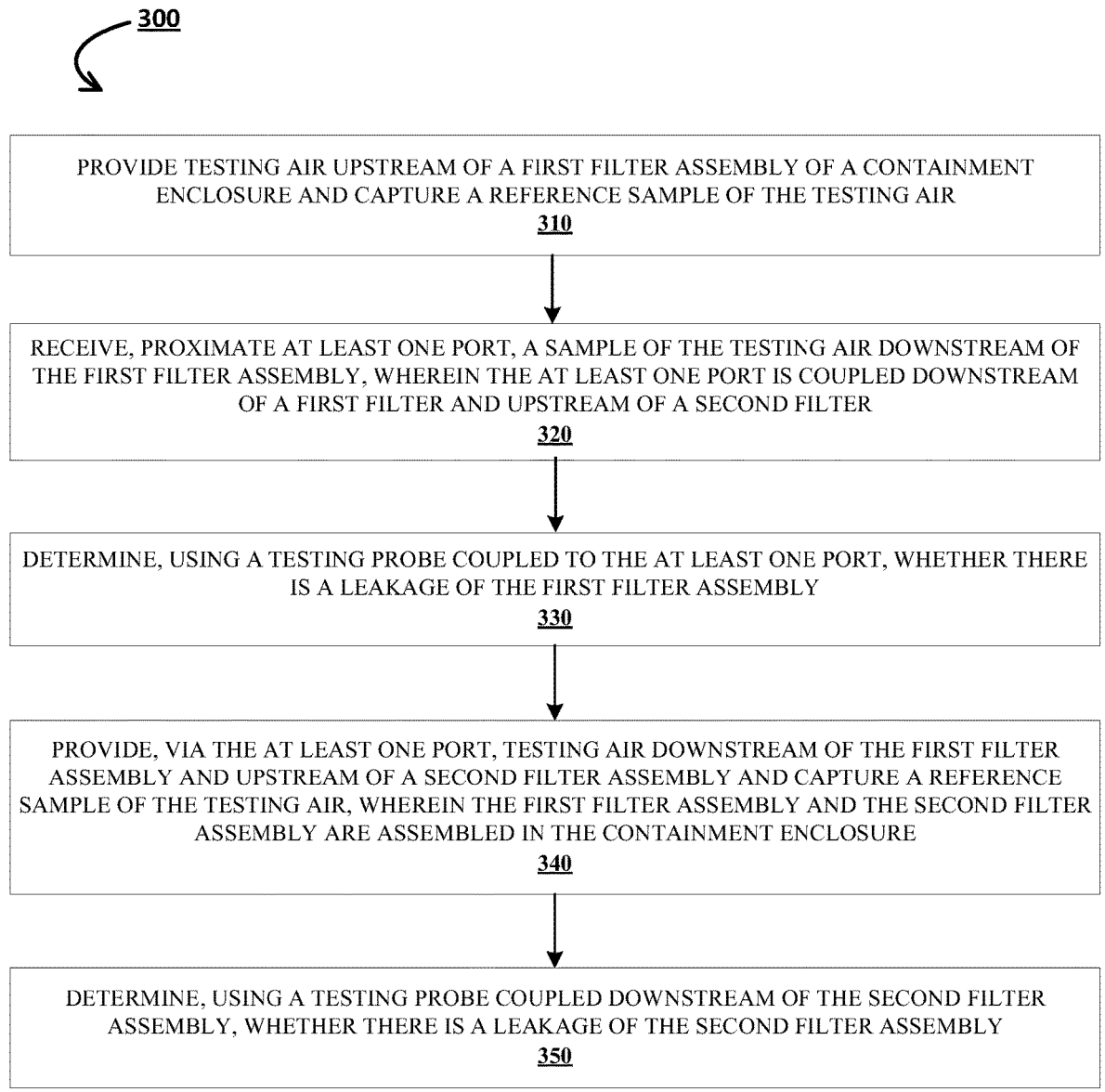
FIG. 3 illustrates high level process flow 300 illustrating a method of testing multiple filters assembled in a containment enclosure, in accordance with one embodiment of the invention.

FIG. 3 illustrates high level process flow 300 depicting a method of testing multiple filters assembled in a containment enclosure, in accordance with embodiments of the invention, accompanied by FIGS. 4A-4D which illustrate various steps of testing multiple filters assembled in a containment enclosure 100.

As illustrated by block 310, for the purposes of testing leakage or integrity of the first filter apparatus 120, testing air (comprising predetermined gases, particulates or a combination thereof) is introduced upstream of the first filter assembly 120. Here, testing air may be provided from a test air dispensing device 190 (such as an aerosol generator) into the enclosure activity compartment 112 through the opening 114, upstream of the first filter assembly 120 (illustrated by FIG. 4A). In some embodiments, the testing air comprises a sub-micron polydispersed oil mist aerosol, such as in concentrations from 10 to 100 micrograms per liter (microgram/liter) at air flows from 50 to 8,100 cfm at 20 psig. In some embodiments, the testing air comprises smoke. In some instances, the first intake housing portion 112a (illustrated in FIG. 2B) is removed prior to introducing the testing air. The testing air subsequently passes through the first filter assembly 120 and onto the first testing compartment 116 and/or the second testing compartment 118 (or a single compartment made of the first testing compartment and the second testing compartment).

In some embodiments, a reference sample of the testing air is captured (e.g., using the testing probe 195) upstream of the first filter assembly 120, either simultaneously during the introduction of the testing air or after the completion of the supply of the testing air upstream of the first filter assembly 120 of block 310. The properties/characteristics of the reference sample, i.e., input air test air (e.g., concentration of constituents, composition, phase, etc.) may be employed as a reference point or initialization value to determine the performance or leakage of the filter. For instance, the difference/variance or comparison of properties/characteristics of the reference sample (input/reference point/initialization value) and that of the sample of the testing air downstream of the first filter assembly 120 (captured at block 320) may help determine any leaks, efficacy and performance of the filter. In some instances, multiple reference samples may be captured at different times during the instruction of the testing air. In such instances, properties/characteristics of one of the reference samples, or an average/median of the reference samples may be employed for determining the difference or variance above.

Next, as indicated by block 320, the method involves receiving a sample of the testing air downstream of the first filter assembly 120 from the at least one port 160 (e.g., the port 162, port 164 or the like). This sample is analyzed by a testing probe 195 coupled to the at least one port 160 (e.g., at second portions of respective port 162, port 164 or the like) to determine whether there is any leakage in the first filter assembly 120 (illustrated by FIG. 4B), as indicated by block 330. Thereby, the present invention is structured to identify filter defects such as pinholes, thin spots, gasket leaks, frame leaks or seal problems quickly, such defects are quantifiably pinpointed without having to remove one or more filters from the enclosure to test a remaining filter. As discussed above, in some embodiments, for the analysis, the properties/characteristics of the reference sample, i.e., input air test air (e.g., concentration of constituents, composition, phase, etc.) may be employed as a reference point or initialization value to determine the performance or leakage of the filter. For instance, the difference/variance or comparison of properties/characteristics of the reference sample (input/reference point/initialization value) and that of the output, i.e., sample of the testing air downstream of the first filter assembly 120 may help determine any leaks, efficacy and performance of the filter.

Figure 4C:
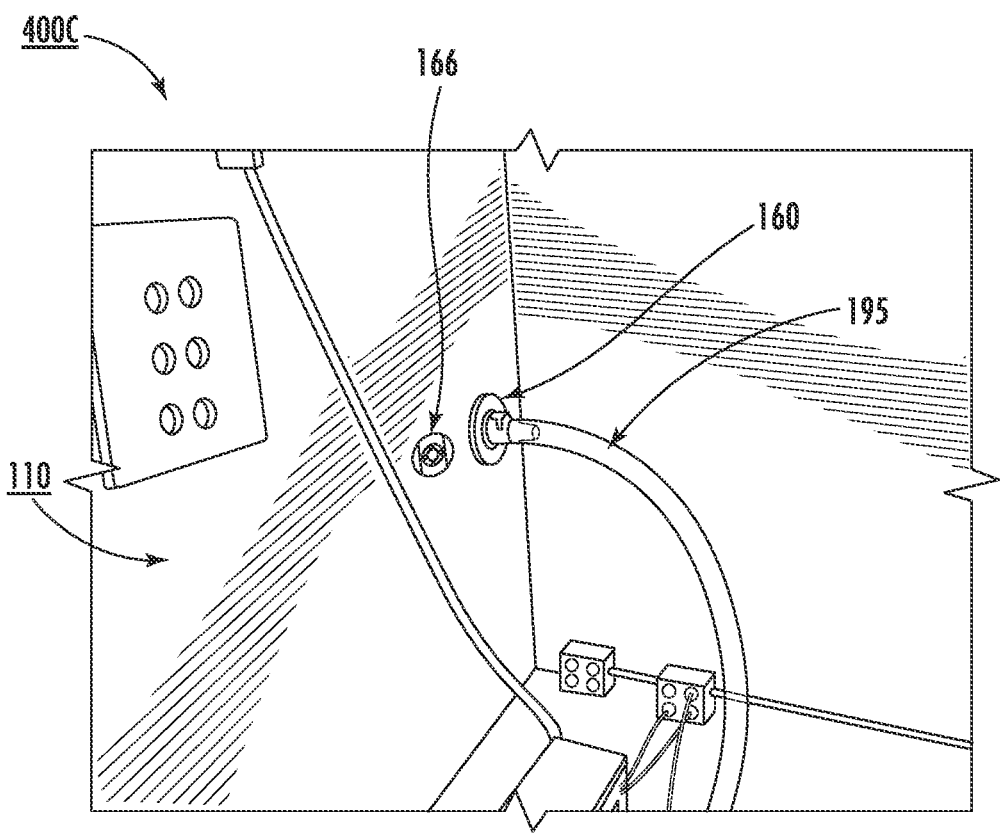
Figure 4D:
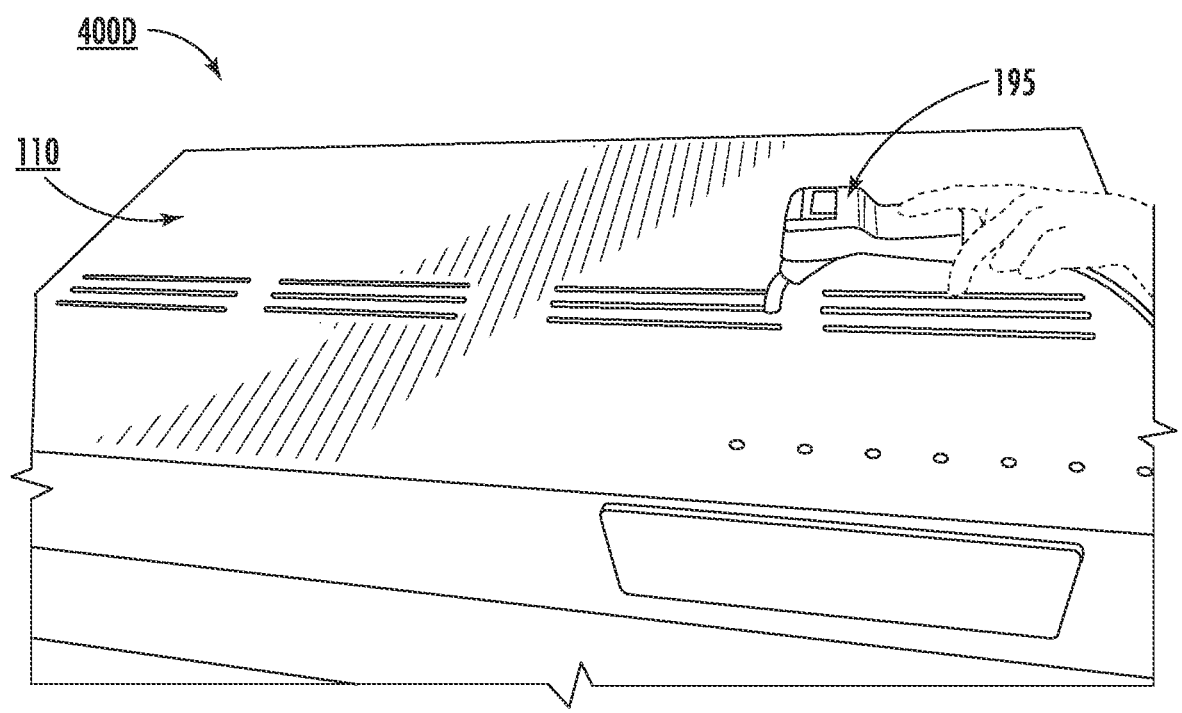

As illustrated by block 340, for the purposes of testing leakage or integrity of the second filter apparatus 140, testing air (comprising predetermined gases, fluids, particulates or a combination thereof) is introduced downstream of the first filter assembly 120 and upstream of the second filter assembly 140. Here, testing air may be provided from a test air dispensing device 190 coupled to the at least one port 160 (e.g., the port 162 or the port 164), as illustrated in FIG. 4C, into the first testing compartment 116 and/or the second testing compartment 118. In some embodiments, a reference sample of the testing air provided upstream of the second filter assembly 140 is captured using at least one port (e.g., auxiliary port 166). The testing air subsequently passes through the second filter assembly 140.

The reference sample of the testing air is captured (e.g., using the testing probe 195 at the auxiliary port 166) upstream of the second filter assembly 140, either simultaneously during the instruction of the testing air and/or after the completion of the supply of the testing air upstream of the second filter assembly 140 (e.g., via the port 162 or the port 164). As such, in some embodiments the test air dispensing device 190 is coupled to a first port 162 to provide the testing air, while the testing probe 195 is coupled to an auxiliary port 166 to capture a reference sample. Alternatively, the testing air dispensing device 190 and the testing probe may be coupled to and/or removed from a single port (162, 164, 166, or the like) to provide the testing air and/or capture the reference sample as needed. The properties/characteristics of the reference sample, i.e., input air test air (e.g., concentration of constituents, composition, phase, etc.) may be employed as a reference point or initialization value to determine the performance or leakage of the filter.

Next, as indicated by block 350, the method involves receiving a sample of the testing air downstream of the second filter assembly 140. The sample may be captured from any number of locations, such as, but not limited to a port located in a third testing compartment 119, 119' downstream of second filter assembly 140, which may include a port located in the housing 110, or may include capturing a sample outside of the housing as the blower device 150 exhausts the air from the housing 110. This sample is analyzed by a testing probe 195 to determine whether there is any leakage in the second filter assembly 140 (illustrated by FIG. 4D). In some embodiments, as discussed above, a reference sample of the testing air provided upstream of the second filter assembly 140 is captured through a reference port (e.g., the auxiliary port 166), which provides a reference or initial value, against which the sample of the testing air captured downstream of the second filter assembly 140 is evaluated, to determine leakage of the second filter assembly. For instance, the difference/variance or comparison of properties/characteristics of the reference sample (input/reference point/initialization value) and that of the sample of the testing air downstream of the second filter assembly 140 may help determine any leaks, efficacy and performance of the filter.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. In addition, where possible, any terms expressed in the singular form herein are meant to also include the plural form and/or vice versa. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein.

What is claimed:

1. A containment enclosure, comprising:
   one or more filter compartments for housing at least a first filter and a second filter; and
   at least one port located in the containment enclosure, wherein the at least one port is operatively coupled downstream of the first filter and upstream of the second filter;
   wherein the at least one port is utilized for operative coupling with a testing probe for sampling test air to determine leakage of the first filter when the test air is provided upstream of the first filter and sampled upstream of the second filter through the at least one port;
   wherein the at least one port is utilized for operative coupling with a test air supply for providing the test air downstream of the first filter in order to sample the test air downstream of the second filter to determine the leakage of the second filter through the at least one port; and
   wherein the at least one port allows for leak testing of the first filter and the second filter without having to remove the first filter and the second filter from the containment enclosure.

2. The containment enclosure of claim 1, further comprises:
   one or more testing compartments operatively coupled between the first filter and the second filter and to the at least one port, wherein the one or more testing compartments are configured for capturing a test air sample and for providing the test air.

3. The containment enclosure of claim 2, wherein the at least one port comprises a plurality of apertures, wherein the plurality of apertures are configured to capture the test air sample from multiple locations downstream of the first filter when testing the first filter, and distribute the test air to multiple locations downstream of the first filter when testing the second filter.

4. The containment enclosure of claim 1, wherein the at least one port comprises: a single sampling and supply port that is utilized for both capturing a test air sample from the test air to determine the leakage of the first filter and supplying the test air to the second filter to determine the leakage of the second filter.

5. The containment enclosure of claim 1, wherein the at least one port comprises:
   a supply port, wherein the supply port is utilized for supplying the test air to the second filter to determine the leakage of the second filter; and
   a reference port, wherein the reference port is utilized for determining a reference point of the test air provided to the supply port to determine the leakage of the second filter.

6. The containment enclosure of claim 1, wherein the at least one port comprises:
   a sampling port, wherein the sampling port is utilized for capturing a test air sample from the test air to determine the leakage of the first filter; and
   a supply port, wherein the supply port is utilized for supplying the test air to the second filter to determine the leakage of the second filter.

7. The containment enclosure of claim 1, wherein the first filter is located in a first chamber and the second filter is located in a second chamber, and wherein the at least one port is operatively coupled to the first chamber downstream of the first filter, to the second chamber upstream of the second filter, or between the first chamber and the second chamber.

8. The containment enclosure of claim 1, wherein the first filter is a Primary HEPA filter and the second filter is a permanent HEPA filter.

9. The containment enclosure of claim 1, wherein the first filter comprises a ULPA filter and the second filter comprises a ULPA filter.

10. The containment enclosure of claim 1, wherein the first filter comprises a Primary HEPA filter and the second filter comprises a ULPA filter.

11. The containment enclosure of claim 1, wherein the testing probe comprises a photometer.

12. The containment enclosure of claim 1, wherein the test air supply comprises an aerosol generator.

13. A method for testing filters of a containment enclosure, comprising:
   providing a containment enclosure, the containment enclosure comprising:
      one or more filter compartments for housing at least a first filter and a second filter; and
      at least one port located in the containment enclosure, wherein the at least one port is operatively coupled downstream of the first filter and upstream of the second filter;
   performing leakage testing of the first filter without removing the second filter, comprising:
      providing testing air upstream of the first filter of the containment enclosure;
      operatively coupling a testing probe with the at least one port for sampling test air to determine leakage of the first filter;
      sampling, via the at least one port, testing air downstream of the first filter; and
      determining, via the testing probe, whether there is a leakage in the first filter; and
   performing leakage testing of the second filter, without removing the first filter, comprising:
      operatively coupling a test air supply with the at least one port;
      providing testing air from the test air supply, via the at least one port, upstream of the second filter of the containment enclosure;
      sampling, via the at least one port, a reference sample of the testing air provided upstream of the second filter;
      sampling, via the testing probe, testing air downstream of the second filter; and
      determining, via the testing probe, whether there is a leakage in the second filter based on at least the reference sample captured upstream of the second filter and the testing air sampled downstream of the second filter.

14. The method of claim 13, wherein the containment enclosure further comprises:
   one or more testing compartments operatively coupled between the first filter and the second filter and to the at least one port, wherein the one or more testing compartments are configured for capturing a test air sample and for providing the test air.

15. The method of claim 14, wherein the at least one port comprises a plurality of apertures, wherein the plurality of apertures are configured to capture the test air sample from multiple locations downstream of the first filter when testing the first filter, and distribute the test air to multiple locations downstream of the first filter when testing the second filter.

16. The method of claim 13, wherein the at least one port comprises:
   a single sampling and supply port that is utilized for both capturing a test air sample from the test air to determine the leakage of the first filter and supplying the test air to the second filter to determine the leakage of the second filter.

17. The method of claim 13, wherein the at least one port comprises:
   a supply port, wherein the supply port is utilized for supplying the test air to the second filter to determine the leakage of the second filter; and
   a reference port, wherein the reference port is utilized for determining a reference point of the test air provided to the supply port to determine the leakage of the second filter.

18. The method of claim 13, wherein the at least one port comprises:
   a sampling port, wherein the sampling port is utilized for capturing a test air sample from the test air to determine the leakage of the first filter; and
   a supply port, wherein the supply port is utilized for supplying the test air to the second filter to determine the leakage of the second filter.

19. The method of claim 13, wherein the first filter is located in a first chamber and the second filter is located in a second chamber, and wherein the at least one port is operatively coupled to the first chamber downstream of the first filter, to the second chamber upstream of the second filter, or between the first chamber and the second chamber.

* * * * *